United States Patent [19]

Shakib et al.

[11] Patent Number: 5,787,262

[45] Date of Patent: Jul. 28, 1998

[54] SYSTEM AND METHOD FOR DISTRIBUTED CONFLICT RESOLUTION BETWEEN DATA OBJECTS REPLICATED ACROSS A COMPUTER NETWORK

[75] Inventors: Darren Arthur Shakib, Redmond; Scott Norin, Newcastle; Max Loell Benson, Redmond, all of Wash.

[73] Assignee: Microsoft Corporation, Redmond, Wash.

[21] Appl. No.: 673,161

[22] Filed: Jun. 26, 1996

[51] Int. Cl.6 ............... G06F 13/42; G06F 15/177; G06F 7/20

[52] U.S. Cl. ............... 395/200.35; 395/200.31; 707/8; 707/201

[58] Field of Search ............... 395/200.31, 200.34, 395/200.35, 200.47, 712, 182.04, 200.43, 200.44, 200.48, 200.59, 200.78, 683, 726; 707/201, 203, 8, 10, 202; 370/390

[56] References Cited

U.S. PATENT DOCUMENTS

| | | |
|---|---|---|
| 5,220,657 | 6/1993 | Bly et al. ............... 395/425 |
| 5,261,069 | 11/1993 | Wilkinson et al. ............... 395/425 |
| 5,440,730 | 8/1995 | Elmasri et al. ............... 395/700 |
| 5,600,834 | 2/1997 | Howard ............... 395/200.34 |
| 5,613,113 | 3/1997 | Goldring ............... 395/618 |
| 5,627,961 | 5/1997 | Sharman ............... 395/182.04 |
| 5,649,195 | 7/1997 | Scott et al. ............... 395/200.3 |

*Primary Examiner*—Mark H. Rinehart
*Attorney, Agent, or Firm*—Workman, Nydegger & Seeley

[57] ABSTRACT

A system and method for distributed conflict resolution between different versions of the same data object which are replicated across a computer network is disclosed. The invention can be utilized with and adapted to any desired replication process. The conflict resolution process allows identification and resolution of conflicts with little or no increased message traffic on the network. The conflict resolution process is independent of the order in which conflicts are resolved and all replica nodes in the enterprise will eventually resolve the conflict in exactly the same manner. The method is adapted for resolution of conflicts between data objects or between objects which define the properties of sets of data objects. The final selection of which version of the object should be maintained and which version of the object should be deleted can be fully automated, completely manual, or a combination of the two.

26 Claims, 8 Drawing Sheets

SYSTEM AND METHOD FOR DISTRIBUTED CONFLICT RESOLUTION BETWEEN DATA OBJECTS REPLICATED ACROSS A COMPUTER NETWORK

BACKGROUND OF THE INVENTION

1. The Field of the Invention

The present invention relates to systems and methods for replication of data, that is, transferring changes (e.g., creation of new data, modification of existing data or deletion of existing data) made locally at one server to a specified list of other remote or locally connected servers. More specifically, the present invention relates to systems and methods for resolving conflicts between different versions of the same replica object replicated on one or more other servers in a computer network.

2. The Prior State of the Art

Today, business and technology trends are changing the way we use computers and information. The personal computer or PC has become the standard business information tool as prices have decreased and computing power has increased. In record numbers, businesses are re-engineering their organizational structure and processes to become faster is and more competitive, in addition to being better able to use the wealth of information resources available today. Never before has there been so much information so readily available nor such high expectations for how much the individual will be able to accomplish by utilizing this information. The result is that people today need access to information everywhere, anytime. In June 1994, Microsoft announced a new product designed to meet these needs, called Microsoft® Exchange.

The main concept behind Microsoft® Exchange is to provide a product that integrates E-mail, scheduling, electronic forms, document sharing, and other applications such as customer tracking to make it altogether easier to turn information into a business advantage. The result is that users can access, organize, and exchange a world of information, wherever they happen to be in the world—whether from the office, the home, or while traveling on the road. In essence, a main barrier to PC-based communication, namely, accessibility and sharing by multiple parties of up-to-the-minute information, has now been significantly reduced.

With the increased accessibility and sharing of information between multiple users, it is now more common than ever for such multiple users to simultaneously or in tandem work on shared data set objects, as, for example, word processing documents, spreadsheets, electronic forms, E-mail messages, graphics images or a host of other such data objects. With such shared use of data objects among multiple users of a computer network, there arises the need for each user to keep all other users of the same data object or the same set of data objects apprised of changes that are made locally by that user. This need gives rise to a process called replication of data, that is, transferring changes (e.g., creation of new data, modification of existing data or deletion of existing data) made locally at one server to a specified list of other remote or locally connected servers.

In a computer network where multiple copies of the same data object reside at several different servers, there arises the possibility of two users working with two different copies of the same data object at the same time. These users may each change the data object in such a way that the two copies of the data object are in conflict. A simple example of such a conflict might be where two users are working on the same proposal document and one user deletes a paragraph while another user adds additional information to the same paragraph. Because of this eventuality, replication processes require systems and methods for discovering and resolving conflicts among multiple copies of the same data object.

In the past, many approaches to conflicts focused on simply preventing conflicts in the first place. For example, many computer networks are currently configured in a client/server topology, such as that illustrated in FIG. 1. In the client/server model, shown in FIG. 1 generally as 10, a single copy of the data object resides on the server machine, as for example server 12 of FIG. 1. Client machines 14 are only allowed to access data objects stored on server 12 in a manner that avoids conflicts. Methods such as file locking so that a data object can only be changed by one client at a time, object check out/check in procedures and other such techniques are used to avoid conflicts. Similar methods are also employed for other types of networks not configured in a client/server topology.

While the above methods avoid conflicts between multiple copies of the same data object, the above methods also severely limit the utility of shared data and hamper efforts of groups of people to work collaboratively on a single project. Other methods have thus been developed which try to overcome the shortfalls of methods which only attempt to prevent conflicts. One such method involves arbitration of conflicts between servers. For example, when two servers realize that their objects are in conflict, they can initiate a two-way communication dialog to arbitrate any conflicts between them. The arbitration process necessarily includes the exchange of multiple communication messages to resolve the conflict in a manner satisfactory to both servers. Such a process generates additional burdens that the communication links between servers must handle. Thus, such a process requires relatively high bandwidth communication links. Furthermore, because the communication dialog is two-way, the physical communication links between the servers must be able to transfer two-way communication messages with a relatively short elapsed time between sending a message and receiving a reply. This places additional burdens on the servers to respond in a timely fashion and may require dedication of more CPU power to the conflict resolution process.

Another problem with the arbitrated conflict resolution method is that if conflicts are multi-way (three or more servers possess objects in conflict), the difficulty of resolving the conflict, the communication bandwidth, CPU power, and the time needed to resolve the conflict increase at an alarming rate. Furthermore, protocols must be established to allow multi-way conflict resolution in an orderly fashion. When resolving multi-way conflicts, the order of resolution may be important, and negotiation of the order of resolution can add additional overhead to an already complex process. It can be readily seen that as the number of systems in conflict increases, the resources needed to resolve the conflict become prohibitively high for arbitrated conflict resolution.

In order to solve some of the problems with the above arbitrated conflict resolution method it may be possible, in some instances, to send all conflicts to a central system where the conflicts would be resolved. This method, however, also creates problems. First, the method increases the communication traffic on the network since all systems in conflict must send their data objects to the central location, and, after the conflict is resolved, receive the results of the conflict resolution process. Another problem with such an approach is that if conflicts occur frequently, because all processing is performed by a central location, one system may have to be totally or substantially dedicated to performing conflict resolution. This can increase the cost of the network. Finally, because objects must be sent to a central location for processing and conflict resolution, work on the objects may have to cease until the conflict is resolved. If conflicts are a common occurrence, such a situation may become untenable.

What is needed to overcome the problems in the prior art is systems and methods for conflict resolution that are capable of resolving conflicts without substantially increasing the communication traffic on the network. It would also be desirable to have systems and methods for conflict resolution that can resolve conflicts without the need to send all conflicts to a central location for resolution. Finally, in order to effectively resolve conflicts, systems and methods must guard against data loss during the conflict resolution process.

SUMMARY AND OBJECTS OF THE INVENTION

1. Glossary of Terms

In order to assist in more easily understanding the terminology used in the following detailed description and summary of the invention, the following definitions for key terms is provided:

Asynchronous store and forward replication: A process of replicating data throughout a network or enterprise by broadcasting locally made changes (e.g., creation of new data, modification of existing data, or deletion of existing data) to a specified list of servers (called replica nodes) which contain copies of the data. Communications in store and forward replication are one-way and there is no acknowledgment of receipt of messages containing the changes.

Backfill: A discovery based data recovery process by which changes held by other servers (called replica nodes) but not held locally are recovered so that the copy of the data (called a replica) held locally is the same as replicas held by other replica nodes.

Change number: A unique identifying code used to identify a particular change made to a particular copy of a data object by a particular replica node.

Change range: A range of changes, identified by a minimum and maximum change number. The change range is inclusive of the minimum and maximum change number.

Data set: A set of objects which can be replicated. In one sense a data set can be thought of as a container with various data set properties which holds or stores data objects, much like a folder contains documents. A populated data set includes the data objects, while an unpopulated data set does not have any associated data objects and only refers to the data set properties.

Data set list: A list of the data set properties for the data sets being replicated across the enterprise. In one sense, a data set list can be thought of as a container which holds or stores data sets (as defined by their data set properties).

Data set properties: A set of information that describes a data set. Data set properties can include such information as a name and/or ID value, and a list of servers which have the contents of a data set (the replica list).

Enterprise: The set of servers (or replica nodes) comprising the replication environment.

Predecessor change list: A list of the maximum change numbers from each replica node that form the basis for the current state of a replica object. Because of the way change numbers are allocated, a predecessor change list captures key information about the change history of a replica object.

Replica: A local copy of a particular data set replicated on one or more replica nodes throughout the network.

Replica list: A list of all replica nodes on the network containing a replica of a particular data set.

Replica node: A server or other location on the network where a copy of a replica resides.

Replica object: An object or group of objects which can be replicated. This term includes at least individual data objects and data set properties.

Site: A plurality of replica nodes in which each node is relatively similar in terms of cost to access data, as compared to the cost between sites. Cost is representative of factors such as the monetary cost to obtain data, the speed of obtaining data, and the reliability of obtaining data.

2. Brief Summary

The foregoing problems in the prior state of the art have been successfully overcome by the present invention, which is directed to a system and method for distributed conflict resolution for resolving conflicts between multiple copies of the same replica object when using a replication process among multiple users connected together on a computer network. The current system and method can be used with virtually any replication process. The preferred replication process, however, is an asynchronous store and forward replication process.

In a store and forward replication process, each server keeps track of locally made changes to a particular copy of a replication data set (sometimes referred to as a "replica") which contains one or more data objects. Each server periodically broadcasts the new locally made changes (since the last replication broadcast) to all other servers with a copy of the same replication data set. The group of other servers also having the replica is kept on a "replica list." The changes are preferably broadcast in the form of updated copies of the changed data objects. This allows each server to update the local replica as changes are received by replacing the older data objects with the newer data objects.

In addition to replication of data set objects, the "properties" of data sets may also be replicated. Properties of data sets can include an identifier such as the name and/or other ID of the data set, access privilege information such as a list of users which can access or change the contents and/or properties of the data set, and a list of servers which contain a replica of the data set (e.g., the replica list for the data set). Data set properties can be replicated independently of the data objects of the data set. Servers may, therefore, receive only the properties of the data set or may receive both the properties and data objects of the data set.

In accordance with the present invention, when the local server receives changes from another server on the replica list, the local server first checks the changed replica objects (data set properties or data objects) to determine if there is a conflict with replica objects stored locally. If the replica object is a data object and if the server finds a conflict, the server then uses a predefined sequence of steps to select a "winner" object and attaches conflicting objects to the winner object. Such a procedure ensures that no data is lost in the conflict resolution process. Furthermore, the sequence of steps is defined so that any server which discovers the same conflict will pick the same winner object and attach the same conflicting objects to the winner object. The sequence of steps are selected so that all conflicts are ultimately resolved the same, independent of the order in which objects are received. This procedure results in a distributed conflict resolution process where all servers having the same conflict will arrive at the same object state without the need to exchange data or arbitrate conflicts.

After a winner object has been selected and the conflicting objects attached, one or more servers can initiate steps to achieve a final conflict resolution. Final conflict resolution may be performed automatically by a designated process or may be performed by a designated user who selects a final winning object. Within the framework of the present invention, it is not necessary to immediately resolve any discovered conflicts. Conflict objects (the winner object with attached conflicting objects) can be changed, updated, replicated, and so forth just like regular data objects. Furthermore, because objects continue to be replicated throughout the network, all servers will eventually recognize the conflict and create the same conflict object. Thus, even if conflict resolution should occur at a designated node, no data beyond the ordinary replication data need be transferred since the designated node will recognize the conflict and create the same conflict object.

The conflict resolution process for data set properties is slightly different from the conflict resolution process for data objects. The conflict resolution process for data set properties does not use an attachment model but uses a predefined sequence of steps to create a merged collection of data set properties where newer properties replace older properties. Where properties comprise a distribution list, older entries in the distribution list are replaced by newer entries, but entries in the distribution list that have no corresponding entry in the distribution list of the conflicting data set are retained. Like the conflict resolution process for data objects, the conflict resolution process for data set properties is designed so that all replica nodes receiving the same conflicting data set properties will resolve the conflict in exactly the same way.

Accordingly, it is a primary object of this invention to provide systems and methods for distributed conflict resolution among replica objects replicated across a computer network which do not require the use of a central conflict resolution location.

Another primary object of the present invention is to provide for systems and methods for distributed conflict resolution among replica objects replicated across a computer network which does not require systems in the network to arbitrate resolution of the conflict.

A further primary object of the invention is to provide systems and methods for distributed conflict resolution among replica objects replicated across a computer network which do not substantially increase the communication traffic on the network.

Another important object of the invention is to provide systems and methods for distributed conflict resolution which are independent of the order in which conflicts are resolved.

Yet another object of the present invention is to provide systems and methods for distributed conflict resolution which can be adapted for use with virtually any replication process.

It is a further object of the present invention to provide systems and methods for distributed conflict resolution that do not significantly degrade in performance when an increasing large number of systems are added to the network.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
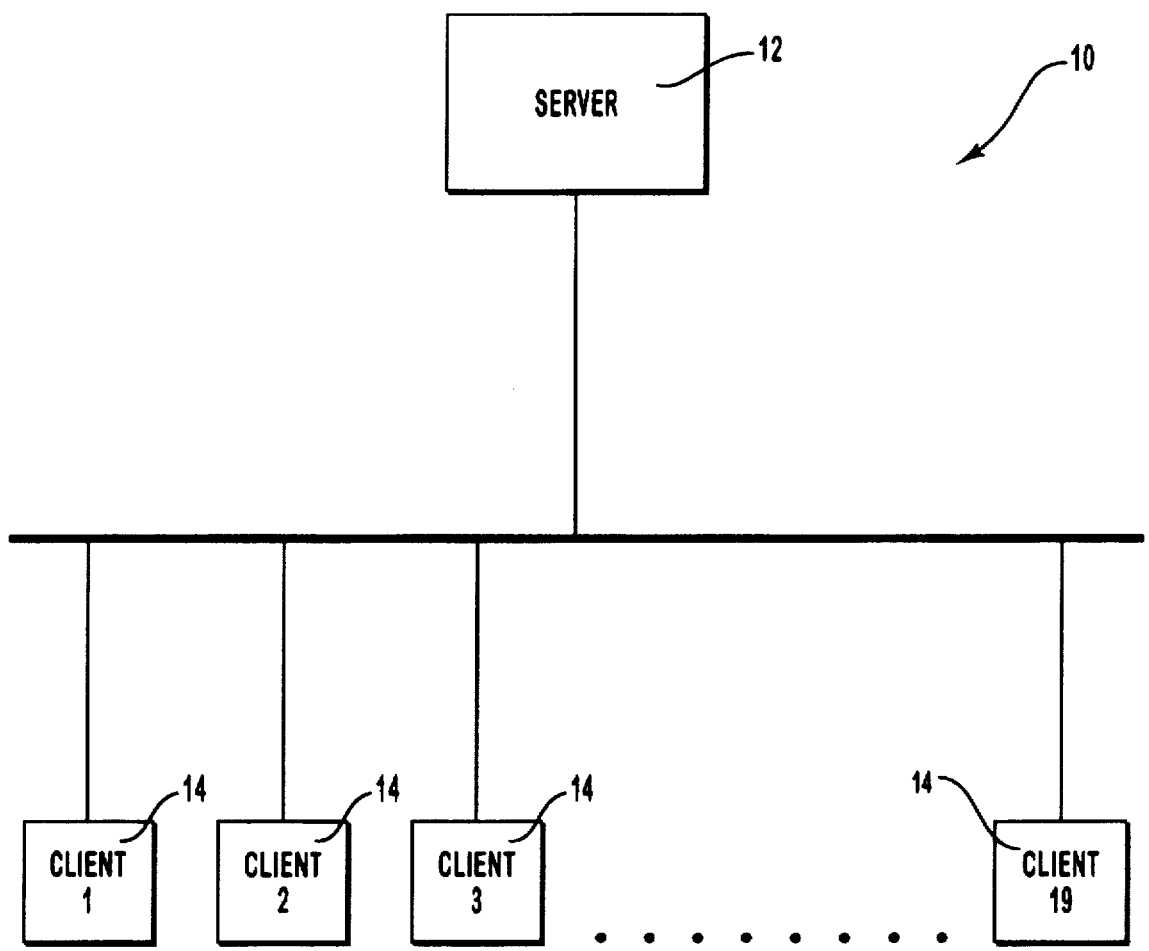
FIG. 1 is a diagram of a prior art client/server network topology.

The following description of the present invention is described by using flow diagrams to describe either the structure or the processing that is presently preferred to implement the systems and methods of the present invention. Using the diagrams in this manner to present the invention should not be construed as limiting of its scope. The present invention contemplates both methods and systems for distributed conflict resolution. The presently preferred embodiment of a system for distributed conflict resolution comprises a general purpose computer. The currently disclosed system, however, can also be used with any special purpose computer or other hardware system and all should be included within its scope.

Embodiments within the scope of the present invention also include articles of manufacture comprising program storage means having encoded therein program code means. Such program storage means can be any available media which can be accessed by a general purpose or special purpose computer. By way of example, and not limitation, such program storage means can comprise RAM, ROM, EEPROM, CD-ROM or other optical disk storage, magnetic disk storage or other magnetic storage devices, or any other medium which can be used to store the desired program code means and which can be accessed by a general purpose or special purpose computer. Combinations of the above should also be included in the scope of program storage means.

Program code means comprises, for example, executable instructions and data which cause a general purpose computer or special purpose computer to perform a certain function or a group of functions.

1. Summary of Store and Forward Replication

The system and method for distributed conflict resolution among replica objects replicated across a computer network as disclosed herein can be utilized with any type of replication process. However, the systems and methods of the present invention do require some sort of replication process. The presently preferred type of replication process is a store and forward replication process.

Although store and forward replication does not form a specific part of the present invention, an understanding of the basics of store and forward replication is helpful in understanding the details of the present invention. For a detailed discussion of store and forward replication, see copending U.S. patent application Ser. No. 08/673.741 entitled "System and Method for Asynchronous Store and Forward Data Replication" (hereinafter referred to as the "Store and Forward Application"), which is incorporated herein by reference. Asynchronous store and forward replication, or simply store and forward replication, is designed to utilize existing network hardware, networking control software, and networking configurations as a transport system to deliver at least one way, unacknowledged communications between systems in a replication enterprise. In the context of this application, networking hardware and any associated networking control software which performs this transport function will be referred to as the Message Transport Agent (MTA). One-way, unacknowledged communication means that the store and forward replication process delivers a message to be transferred to the MTA and does not receive feedback as to the success of the transfer. Primarily for efficiency reasons, the systems and methods that are the subject of this invention and the invention described in the copending Store and Forward Application have been designed with the presumption that no acknowledgement or feedback is required. The concepts disclosed in this application and in the copending Store and Forward Application, however, could be modified to use any status or information available from the MTA. Similarly, as previously described, the concepts of this invention do not depend on the type of replication process employed and virtually any type of replication process can be used. However, the store and forward replication process provides the presently preferred context of this invention.

Figure 2:
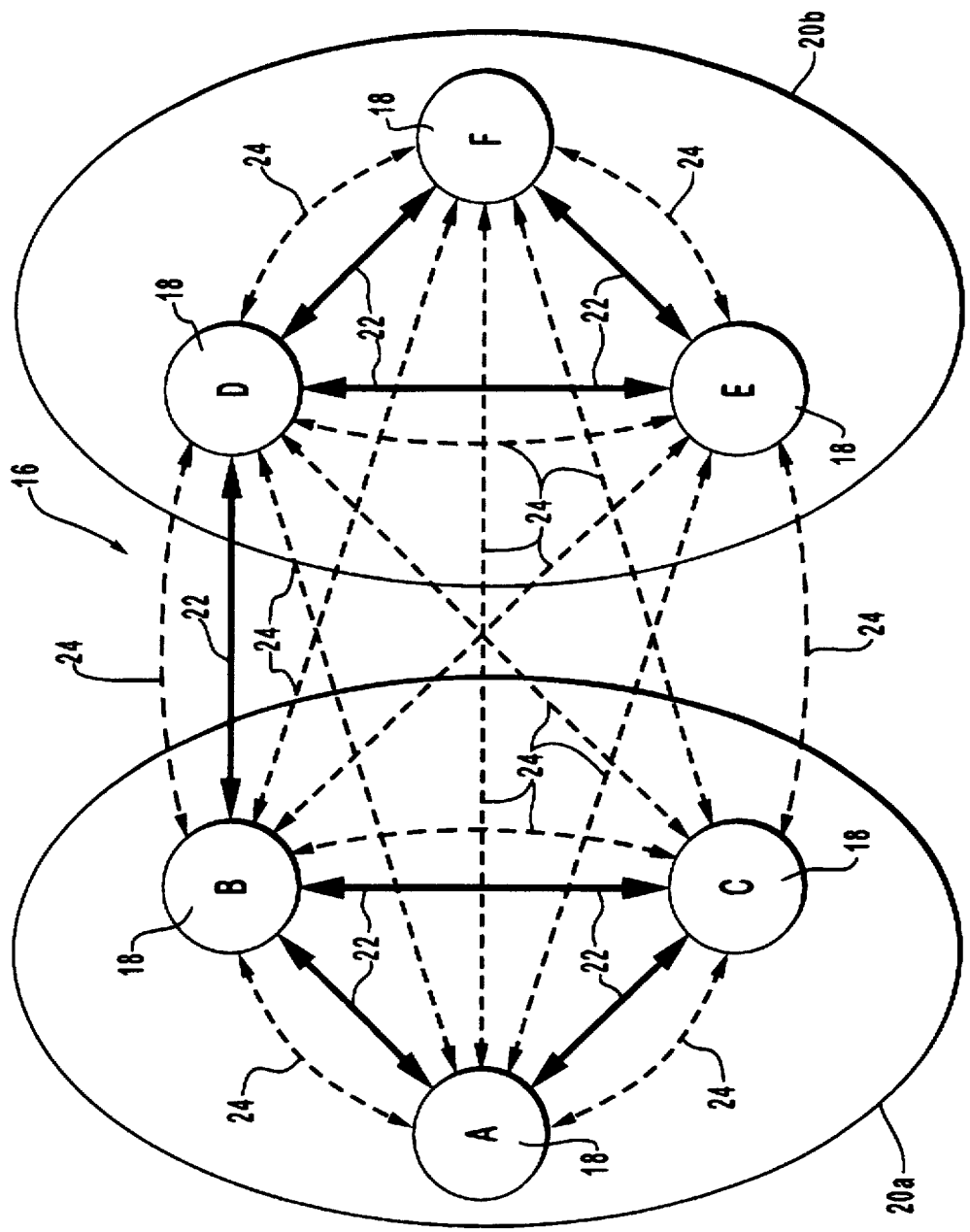
FIG. 2 is a diagram representing a network which is logically completely connected.

Turning now to FIG. 2, an example of the network over which data is to be replicated is shown generally as 16. In this patent, such a network will be referred to as a "replication enterprise" or simply an "enterprise." In a store and forward replication process, a given populated data set, a copy of which is referred to as a "replica," and/or a given unpopulated data set, referred to as "data set properties," is replicated at one or more locations in the enterprise. In FIG. 2, the locations where a replica or data set properties can reside are referred to as "replica nodes" and are shown as 18 and labeled A–E. The term "replica node" is preferred over the term "server" since "server" often implies a system which serves one or more desktop, laptop, or other computers. Replica nodes include not only servers in the traditional sense of the term, but also desktop, laptop, or any other system where a copy of a replica may reside. In the context of this invention, "replica" will be used to refer to a specific copy of a set of one or more data objects which are to be replicated as a unit across one or more replica nodes. The term is intended to be read broadly and encompasses any type or format of data to be replicated. The term "data object" should also be read broadly and encompasses any individual unit of data such as a data file, a spread sheet, a word processing document, or any other type of data. "Unpopulated data set" or "data set properties" refer specifically to data sets without their associated data objects. The term "replica objects" will be used to refer broadly to either data objects or data set properties.

In the enterprise, replica nodes may be grouped into "sites." A site is a plurality of replica nodes with relatively similar costs to access data. Replica nodes within a site are generally, but not necessarily, located in a relatively localized geographic area and have high speed connectivity between nodes, such as, for example, Local Area Network (LAN) connections. The cost to access data between sites is generally much greater than the cost to access data within a site. Site groupings are typically assigned by a system administrator. FIG. 2 shows two sites, designated 20a consisting of replica nodes A, B, and C, and 20b consisting of replica nodes D, E, and F.

Replica nodes are connected by physical network connections. In FIG. 2, the physical network connections 22 are illustrated by the solid arrows. As shown in FIG. 2, replica nodes 18 may not be fully connected by physical network connections 22. (Note that the site containing the A B C group is connected to the site containing the D E F group by only a single link.) For store and forward replication, however, all that is required is the physical connections be sufficient to provide a data flow path between each of the replica nodes. Furthermore, physical connections 22 may be of any type. For example, the physical connections between replica nodes A, B, and C may be a LAN or other high speed link while the connections between replica nodes D and B may be a slower dial up, Internet, Wide Area Network (WAN), or other long haul connection.

By ensuring a data flow path between each of the replica nodes, the entire enterprise is logically fully connected even though physical connections are of arbitrary topology. In FIG. 2, the logical network connections forming the fully connected logical topology are illustrated by dashed arrows 24.

In a store and forward replication system, each replica node keeps track of all changes made locally to a replica object. Each replica node then periodically broadcasts new changes that have occurred since the last replication broadcast through the MTA to all other replica nodes having a copy of the replica object. For data objects, a list of replica nodes having a particular replica (referred to as a "replica list") is kept locally so the local replica node knows which of the replica nodes in the enterprise needs to receive an updated copy of the local replica. Data set properties may be replicated to all replica nodes in the enterprise, in which case no such list needs to be kept, or may be replicated to one or more subsets of the replica nodes in the enterprise, in which case one or more lists similar to a replica list needs to be kept. These lists would indicate which replica nodes receive copies of the properties of which data sets.

Because copies of a single data object and/or data set properties are located at various replica nodes throughout the enterprise, a situation inevitably arises where one copy of a replica object on one replica node is changed so that it is in conflict with another copy of the same replica object on another replica node. Thus, the need arises to have a mechanism which can quickly and easily recognize and resolve conflicts between different copies of the same replica object located at various locations throughout the enterprise. This situation is addressed by the instant invention.

2. Summary of Distributed Conflict Resolution

A guiding principle of the distributed conflict resolution method of the present invention is for each replica node to both identify when replica objects are in conflict and resolve the conflicts in an identical manner without the need to exchange communication messages and without the need to rely on a central location to arbitrate conflicts. In accordance with the present invention, as copies of replica objects are received from other replica nodes throughout the enterprise, the received copy of the replica object is compared to the local copy of the replica object in order to discover any conflicts between the copies. If there is no conflict, then in a preferred embodiment the local copy of the replica object is replaced by the received copy of the replica object if the received copy represents a more recent version of the replica object. If, however, a conflict is discovered then in the case of data objects, a "winner" copy of the data object is selected and the other copy of the data object is attached to the winner copy. The winner copy is a preliminary selection made by each replica node. Final resolution of the conflict is deferred until a later time. The process of selecting a winner copy is crafted so that each replica node which discovers the conflict will select the same winner copy. Thus, since the conflict is resolved identically at each node independently, there is no need to exchange any data to select the winner copy of the data object.

After the conflict has been recognized and the winner copy has been selected, one or more replica nodes may then take steps to achieve final resolution of the conflict. Such steps may include notifying a designated user, such as the owner of the data object, that a conflict exists and allowing the user to select which copy of the data object should be used and which copy should be deleted. Other options include automated final resolution via any appropriate mechanism. For example, a spread sheet program may be able to reconcile the differences between two versions of a spread sheet. Similarly, a word processing program may be able to create a red-lined version of a single document from two different versions of the document while inserting the identity of the individuals who made different changes in the document.

In the case of data set properties, the conflicting objects are merged in such a way that newer versions of the properties replace older versions of the properties. When properties comprise a distribution list, newer entries in the distribution list replace older entries in the distribution list while entries in the distribution list that have no corresponding entry in the conflicting object are retained. The result is an updated set of properties which retains any unique entries of the distribution lists of either of the conflicting data set property objects. This process is also crafted so that all replica nodes resolve the conflict in exactly the same way without exchanging any data other than the data set properties.

Figure 3:
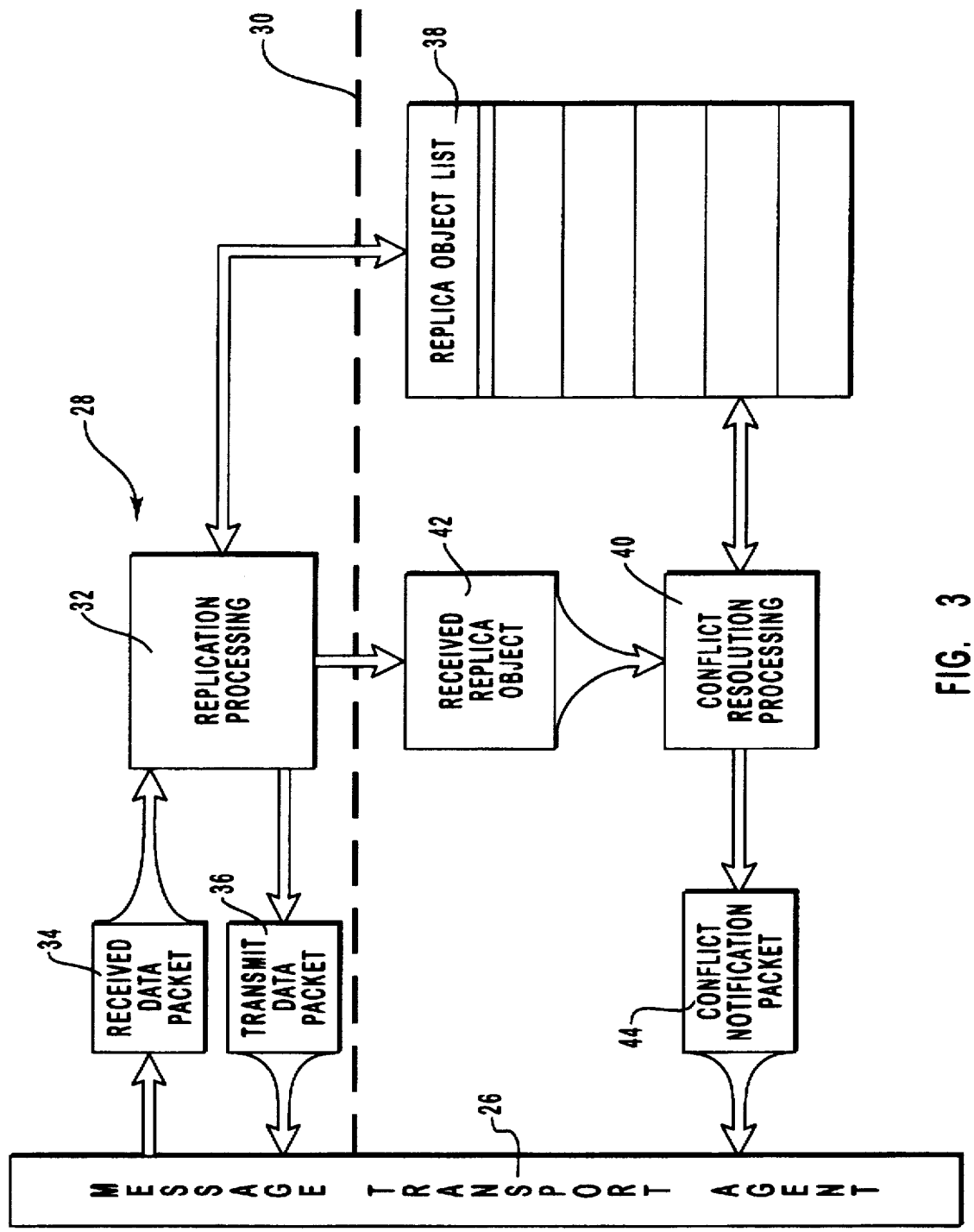
FIG. 3 is a block diagram representing the relationship of the systems and methods of distributed conflict resolution of the present invention to an associated replication process.

Turning now to FIG. 3, a simplified conceptual block diagram of the present invention is presented. As previously described, the present invention relies on message transport agent 26 to transport message packets to and from various replica nodes in the enterprise. Furthermore, as previously described the present invention resolves conflicts among replica objects replicated across an enterprise by a replication process. Thus, although not part of the present invention, a replication process is presumed. In FIG. 3, the replication process is shown generally as 28 and is located above dashed line 30. The present invention will work with any type of replication process although the preferred replication process is a store and forward replication process.

In FIG. 3, a generic replication process is illustrated by replication processing block 32. As illustrated in FIG. 3, replication processing block 32 transmits and receives data packets via message transport agent 26. The received and transmitted data are illustrated in FIG. 3 by received data packet 34 and transmit data packet 36. Received data packet 34 and transmit data packet 36 preferably contain at least the changes which have been made to various replica objects located in replica object list 38. Replica object list 38 comprises copies of one or more replica objects which are replicated at various replica nodes throughout the enterprise.

General replication processing block 32 may replicate a wide variety and format of data. For example, replication processing block 32 may replicate data objects such as word processing documents, spreadsheets, data files, E-mail messages, and the like. As disclosed in the Store and Forward Application, previously incorporated by reference, in the case of store and forward replication, a group of one or more data objects replicated as a unit across the enterprise is called a "data set." A local copy of a data set is often referred to as a "replica."

In some sense, a data set can be thought of as a container which holds one or more data objects similar to the way a folder holds documents or a computer directory holds computer files. A data set is defined by various properties such as a common name that is displayed to a user and/or other ID value, access control information that specifies which users can access, create and/or modify the data objects and/or the data set properties, a list of replica nodes which have a copy of the populated data set, and any other information that is useful or necessary to describe the various properties of a data set for the particular replication implementation.

Data sets can also be organized in a hierarchical fashion, such as computer directories or the folder tree of an E-mail system. In such a case, data sets may have a parent property which describes the parent of a data set. For more information regarding the replication of hierarchical data, see copending U.S. patent application Ser. No. 08/679,209, entitled "System and Method for the Distribution of Hierarchically Structured Data in a Store and Forward Replication Process," (hereinafter the "Hierarchical Data Replication Application"), incorporated herein by reference.

Replication processing block 32 may replicate both data objects and data set properties across the enterprise. Data objects and data set properties are broadly referred to as replica objects. As the replica objects are received and processed by replication processing block 32, they may be kept in a list or store such as replica object list 38 of FIG. 3. Replica object list 38 can represent either a list of data objects, in which case replica object list 38 would be a data set, or a list of data sets, in which case replica object list 38 would be a data set list. Replication of data set properties and data objects are conceptually identical, if you think of replication as the process of distributing copies of the contents of a container of data. When a data set list is the container, the contents of the container are data sets (as defined by their data set properties). When a data set is the container, the contents are data objects.

Below dashed line 30 is located conflict resolution processing block 40. Conflict resolution processing block 40 represents the instant invention. As replica objects are received, as for example, received replica object 42, they are checked for conflicts with the replica objects of replica object list 38. If no conflict is found, then received replica object 42 replaces the corresponding replica object of replica object list 38 if received replica object 42 represents a later version than the corresponding replica object in replica object list 38. This ensures that the latest version of the replica object is maintained within replica object list 38.

From the above description, it is apparent that in the preferred embodiment, the replication process illustrated by replication processing block 28 exchanges modified replica objects when changes are made. Thus, when a change is made to a particular replica object, it is presently preferred that the updated replica object then be replicated across the enterprise. Replicating entire modified replica objects results in easier conflict resolution processing. As an alternative, the replication process could exchange only changes to replica objects. While it is presently believed that such a process would function adequately, this method is not preferred since it greatly complicates many aspects of the conflict resolution process. However, such a process should be included within the scope of the present invention.

Returning now to FIG. 3, conflict resolution processing block 40 may be configured to notify one or more replica nodes or users when conflicts occur. This notification process can be part of a final conflict resolution in the case of conflicting data objects or may be part of the usual conflict resolution process for conflicting data set properties, as more fully described hereafter. Furthermore, as more fully described hereafter, replica node conflict notification is optional in many cases. In FIG. 3, replica node or user notification capability is illustrated by conflict notification packet 44.

3. Conflict Resolution Description

Figure 4:
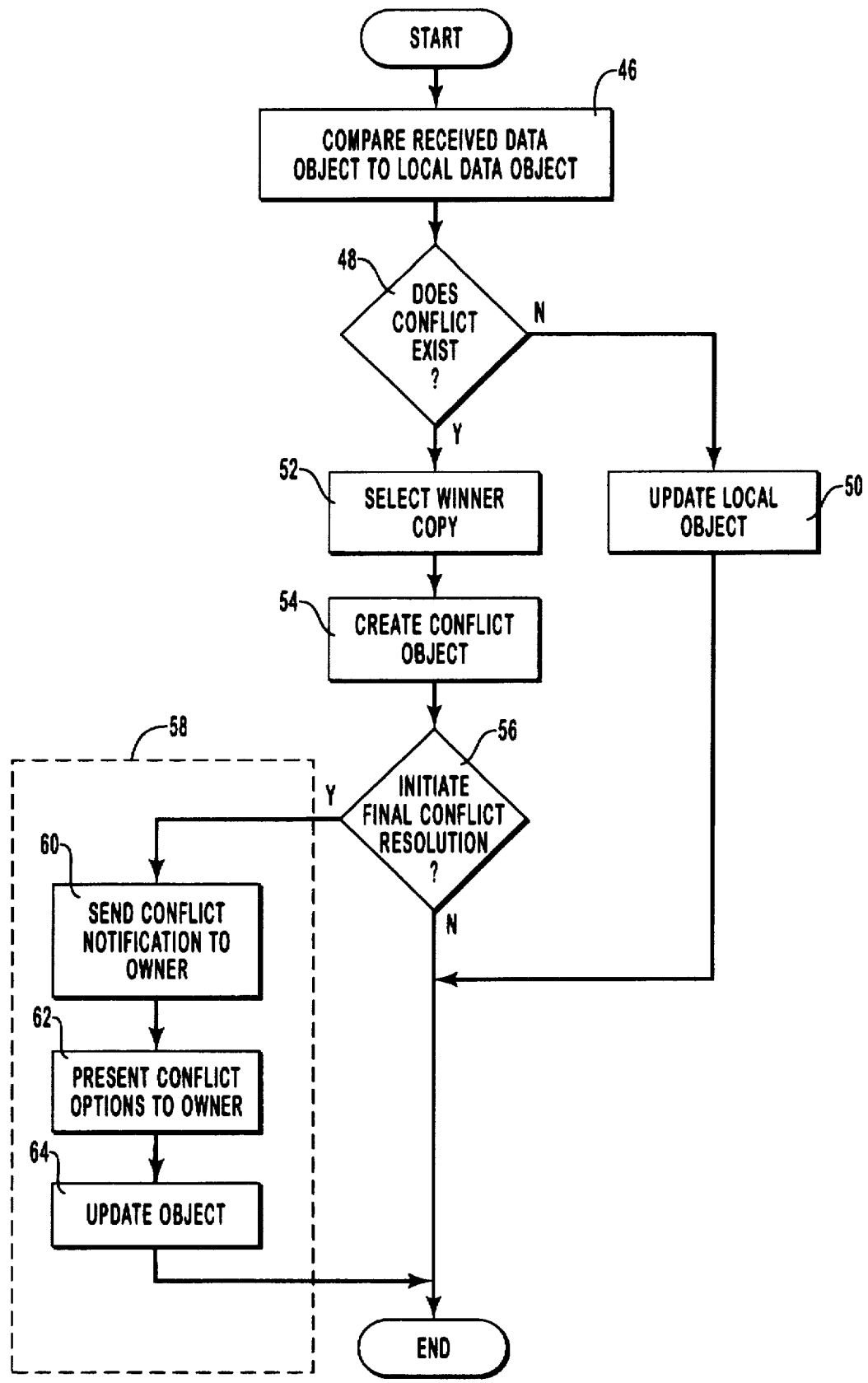
FIG. 4 is a flow diagram illustrating the processing of the distributed conflict resolution system and method of the present invention.

Turning next to FIG. 4, a flow diagram of the details of conflict resolution processing block 40 for conflicting data objects of FIG. 3 is presented. The first step in resolving a conflict between two replica objects is to compare the received replica object to the local replica object and determine if a conflict exists. As will be illustrated below during the discussion of conflict resolution between conflicting data set properties, this step is the same for any conflicting replica objects. In other words, both in the process for resolving conflicts between data objects and in the process for resolving conflicts between data set properties, it must be determined whether a conflict exists. Accordingly, embodiments within the scope of the present invention can comprise means for determining if a conflict exists between a local copy of a replica object and a received copy of the replica object. By way of example, and not limitation, such means is illustrated in FIG. 4 by step 46 and decision block 48. Comparing two replica objects to determine if a conflict exists between them may not be as simple and straight forward as first believed. Just because two replica objects have differences does not mean that a conflict exists between them. A conflict only exists between two replica objects when they are changed in such a manner that data may have to be drawn from both replica objects to create a common replica object that includes all of the changes from both replica objects. For example, if one replica object contains all of the changes of another replica object, then no conflict exists between the two replica objects. This statement is true even if the one replica object contained more changes than the other.

From the above description, a general rule regarding conflicts can be derived. If one copy of the replica object is simply a modification of another copy of the replica object, then no conflict exists. If, however, each replica object contains changes that are not found in the other replica object then a conflict exists. For example, suppose copy one of the object contained changes A, B, and C. Now suppose that a second copy of the same object contained changes A, B, and D. Because copy number one contains a change not found in copy number two (change C) and copy number two contains a change not found in copy number one (change D), a conflict exists between the two copies of the object. On the other hand, if copy number one contained changes A, B, and C and copy number two contained changes A, B, C, and D, then no conflict would exist since copy number two is simply a modification of copy number one.

From the above description, it is apparent that in order to determine if a conflict exists between two copies of the same replica object, a comparison of the replica objects must be made in order to determine if changes exist in one copy of the replica object which do not exist in the other copy of the replica object. This comparison process should be able to compare the revision history of the replica objects. This revision history can be stored expressly with the replica object, or can be derived during the comparison process from the information stored with the replica object. In other words, to determine if a conflict exists the present invention looks at the changes made to each replica object to determine whether one replica object completely includes all the changes of the other replica object. Thus, as long as each replica object contains sufficient information to identify the changes forming the basis for the present state of each replica object, a comparison process can be developed which extracts or reconstructs the change information and compares it.

In a preferred embodiment of the present invention, each replica object has associated with it a change number and a predecessor change list. Because replica objects can be changed at any one of a number of replica nodes throughout an enterprise, it is preferred that when a replica node changes a replica object, that the replica node assign to that copy of the replica object a unique ID. This unique ID is called a change number. Any method of generating unique change numbers which are unique across the entire replication enterprise is acceptable. However, it is presently preferred that unique change numbers be assigned by concatenating a unique replica node ID which uniquely identifies the replica node with a counter value which is incremented every time a change number is assigned by that replica node. Thus, in the preferred embodiment the change number has the form:

| Replica Node ID | Local Counter Value |

The replica node ID value is referred to as a Globally Unique ID (GUID). When concatenated with the local counter, the resulting quantity is sometimes referred to as a Fast Unique ID (FUID). Since the GUID is unique, and since the counter value is incremented anytime an ID value is assigned, the entire FUID value is unique. The local counter value is preferably large enough to avoid a short term rollover problem. However, when a rollover occurs, the problem of conflicting IDs can be prevented by assigning a new GUID to the replica node at the moment of rollover. More details of this method of generating FUID values can be found in the copending Store and Forward Application, previously incorporated herein by reference.

If each replica node assigns a change number to a copy of a replica object when it is changed, then when the replica object is received, a determination can be made as to whether the locally stored copy of the replica object is the same as the copy of the replica object which has been received. In essence, the change number acts as a version number identifier for a particular copy of the replica object.

It is also preferred that each replica object have associated therewith a predecessor change list. The predecessor change list contains a change history of the replica object. The predecessor change list preferably contains enough information to determine which change numbers form the foundation for the current state of the replica object. If FUIDs are used as change numbers, then the predecessor change list need not contain all prior change numbers of the replica object. The manner in which FUIDs are generated and assigned provides a mechanism for reducing the amount of information in the predecessor change list. As previously described, FUIDs are generated by concatenating a GUID with a local counter value. Each time a FUID is assigned, the counter value is incremented. This ensures that for FUIDs generated by a single replica node, FUIDs with a larger counter value were generated later in time. Thus, for a single replica object, a FUID generated at a particular replica node and assigned as a change number to that replica object necessarily implies that all prior counter values which have been assigned to that replica object by that replica node form at least part of the foundation for the current state of the replica object. When FUIDs are used as change numbers, then, the predecessor change list need only contain the largest FUID generated by each replica node for that particular replica object.

If replica objects have associated with them a change number and a predecessor change list which contains a change history of the replica object, then in order to determine whether one replica object contains changes not found in another replica object, the predecessor change lists simply need to be compared. Thus, the means for determining whether a conflict exists can comprise, for example, means to compare change histories, such as predecessor change lists. From the predecessor change lists, it is readily apparent whether a conflict exists between two copies of a replica object or whether one copy of the replica object is simply a modification of another copy of the replica object. In order to clarify this point, consider the following predecessor change lists. In these examples, the letter represents the replica node GUID and the number represents the local counter of that replica node.

Example 1: (A10, B30, C15) contains (A9, B10, C10) and there is no conflict between these two.

Example 2: (A10) does not contain (A10, B10) and a conflict exists.

Example 3: (A10, B30, C15) does not contain (A11, B29, C14) and there would be a conflict.

It is apparent from the above discussion that by assigning a unique change number to each change that is made to a copy of a replica object and by maintaining a predecessor change list which contains a history of the changes made to the copy of the replica object, that conflicts between two replica objects can be quickly and easily identified. Such a scheme obviates the need to compare the replica objects themselves in order to reconstruct revision histories to identify conflicts. This scheme, therefore, greatly simplifies the conflict resolution process and, for that reason, is part of one preferred embodiment.

Returning now to FIG. 4, if a conflict does not exist between the two copies of the data object, then the local copy of the data object is updated and the process terminates. This is indicated by step 50 in FIG. 4.

If, however, a conflict exists between the two copies of the data object, then steps must be taken to resolve the conflict. As previously mentioned, the conflict resolution process must not lose any data during the resolution process. Also, it is preferred that little or no additional traffic be generated on the network to resolve the conflict. In order to achieve these two goals, the present invention uses an attachment model for resolving conflicts between data objects. In other words, when a conflict exists between two copies of the same data object, one copy is selected as a "winner" copy and the other copy is attached to the winner copy. The "winner" copy is a preliminary selection made by each replica node. A final, ultimate resolution is deferred until later. Rather than attach the entire object, it would also be acceptable to attach only sufficient information to identify the unique or conflicting parts of the data objects. The attachment model ensures that no data is lost until final resolution of the conflict can be performed.

If a conflict exists, the first step is to select a winner copy of the data object. The embodiments within the scope of this invention can therefore comprise means for selecting a winner copy of the data object from among the local copy of the data object and the received copy of the data object. By way of example, this is indicated in FIG. 4 by step 52. For reasons that will become more apparent hereafter, it is presently preferred that the process of selecting a winner copy of the data object be designed so that no matter where a conflict is recognized, all replica nodes throughout the enterprise will select the same winner copy. In other words, given the same choices of different copies of the same data object all replica nodes throughout the enterprise will select the same copy as the winner copy. This implies that the means for selecting the winner copy should be a deterministic process which relies solely on information available in the two copies of the data.

In order to fulfill the goals previously described, the means for selecting the winner copy can comprise any deterministic process which selects a winner copy based on information contained in the copies of the objects under consideration. It is, however, presently preferred that each copy of the data object have associated therewith a time stamp. This time stamp should be the time that the change number was assigned to the copy of the data object. Thus, the time stamp is the time last modified and is assigned by a replica node when a change is made to a particular copy of a data object. The winner copy is then preferably selected by comparing the time stamps of the two copies of the data object and selecting the copy having the latest time stamp as the winner copy of the data object.

The winner object could also be selected as the object with the earliest time stamp. Using the time stamp to select a winner object is simply a way of ensuring that all replica nodes pick the same object as the preliminary winner. The ultimate determination of which copy is finally chosen, or the determination that a new copy should be created which combines the objects, is deferred until the final resolution step discussed below.

Note that because the time stamp is simply used as a deterministic way of picking between two copies of the data object, there is no need to have synchronized time clocks throughout the enterprise. It is simply a method for deterministically picking one copy of the data object as the winner copy. Note that any other method would also be adequate. For example, if the time stamps are equal, then the means for selecting the winner object can comprise means for comparing the change numbers of the two copies of the data object and selecting the copy with the largest change number as the winner copy.

From the above description, it is apparent that in the preferred embodiment a data object has associated therewith several pieces of information. Thus, it is preferred that in addition to whatever other information is needed to accomplish replication, a data object comprise:

| Data Object | Change Number | Predecessor Change List | Time Stamp |

After one copy of the data object has been selected as the winner, in accordance with the present invention, the other copy is attached to the winner copy. Thus, embodiments within the scope of this invention can comprise, for example, means for attaching to the winner copy at least the copy of the data object not selected as the winner copy. The winner copy, along with any attachments and additional information which is included, is sometimes referred to as the "conflict object." In FIG. 4, after a winner copy has been selected, the next step is to create the conflict object. Thus, by way of example, the means for attaching to the winner copy at least the copy of the data object not selected as the winner copy is indicated in FIG. 4 by step 54.

In creating the conflict object, it is presently preferred that the winner copy of the data object contain slightly more information than the copy of the data object selected as the winner. In creating the conflict object, it is presently preferred that the winner copy contain at least the selected copy of the data object, the change number of the selected copy, the union of the predecessor change lists of both copies of the data object, and the time stamp of the winner copy. In other words, the winner copy is simply the selected copy with a modified predecessor change list which represents the union of the predecessor change lists of the two objects. The union of two predecessor change lists is simply a list of the largest change numbers from each replica node in both lists. Consider the following two examples of how the union of two predecessor change lists are calculated:

Example 1: The union of(A10) and (A10, B10) is (A10, B10)

Example 2: The union of(A10, B30, C15) and (A11, B29, C14) is (A11, B30, C15)

Because the winner copy has a modified predecessor change list, then in keeping with the goal of not losing any information during the conflict resolution process, it is preferred that the original copy of the data object selected as the winner as well as the non-winner copy of the data object be attached to the winner copy. Embodiments within the scope of this invention can therefore comprise means for attaching the winner copy of the data object to itself. The preferred form of the conflict object is therefore:

When one of the data objects is a conflict object, a mechanism must be in place to decide which of the attached objects should be kept and attached as part of the created conflict object and which of the attached objects should be deleted. The goal is to create a conflict object which has attached to it all objects necessary to finally resolve the conflict and which does not contain any redundant data. Embodiments within the scope of this invention which comprise means for attaching to the winner copy at least the copy of the data object not selected as the winner copy can also comprise means for deciding which attached objects should be kept and which attached objects should be eliminated. For example, consider a conflict which arises between conflict object 1:

| A8 | A8, B14, D5, E3 | $T_1$ |
| --- | --- | --- |
|    | A8   | A8, B7, D5 | $T_1$ |
|    | B14  | B14, D5    | $T_2$ |
|    | E3   | B7, E3     | $T_3$ | and conflict object 2:

| D6 | B14, C4, D6 | $T_5$ |
| --- | --- | --- |
|    | D6  | B14, D6 | $T_5$ |
|    | C4  | B3, C4  | $T_6$ |

In the above conflict objects, the first number is the change number for the individual object, the list of numbers is the predecessor change list, and the third number is a time stamp. For example, in conflict object 1, the change number of the winner copy is A8, the union predecessor change list is A8, B14, D5, and E3, and the time stamp is T1.

When a conflict arises between these two conflict objects, the algorithm must decide which of the attached objects are to be kept in the final conflict object and which of the attached objects are to be deleted as redundant in the final conflict object. A quick examination of conflict object 1 and conflict object 2 above will reveal that a conflict exists between the two objects. Conflict object 1 has changes A8 and E3 which are not found in conflict object 2, and conflict object 2 has change C4 and D6 which are not found in conflict object 1.

Figure 5:
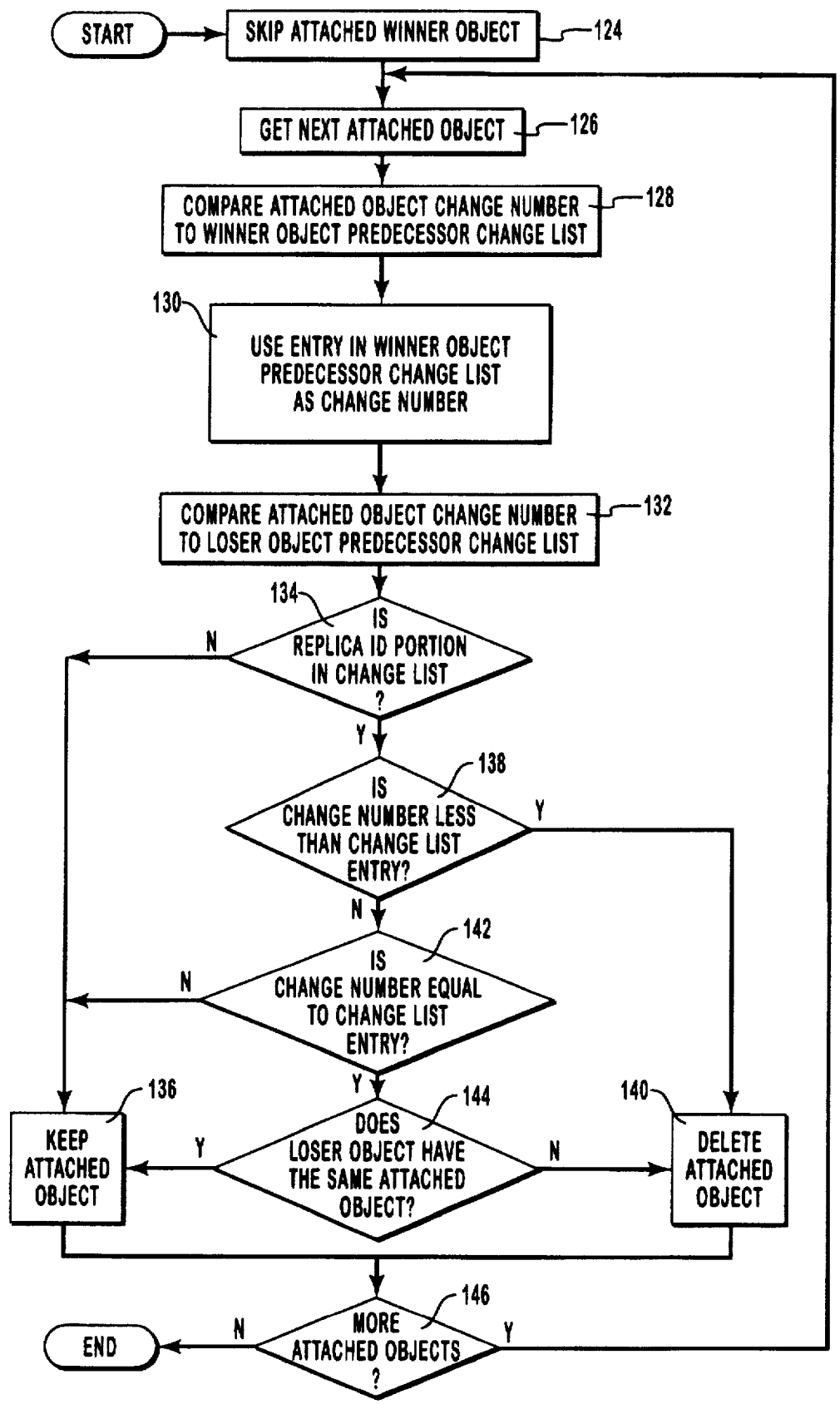
FIG. 5 is a flow diagram illustrating how attachments are processed during conflict resolution.

Referring now to FIG. 5, a flow diagram of one preferred embodiment that determines which of the attached objects should be kept and which should be deleted is presented. When a conflict arises between two conflict objects, each of

| Winner Copy | Winner Change Number | Union Predecessor Change List | Winner Time Stamp | |
| --- | --- | --- | --- | --- |
|  | Winner Copy | Winner Change Number | Winner Predecessor Change List | Winner Time Stamp |
|  | Non-Winner Copy | Non-Winner Change Number | Non-Winner Predecessor Change List | Non-Winner Time Stamp |

Although the above description has been directed to two copies of the data object which are not conflict objects, it should be apparent that similar logic applies if one of the copies of the data object is, itself, a conflict object. When one of the copies of the data object is a conflict object, then redundant data is deleted and all copies of the data object not selected as the winner copy are attached to the winner copy at the same level.

the attached objects in both the winner conflict object and non-winner or loser conflict objects must be checked in order to decide which of the attached objects will ultimately be attached to the conflict object which is created. FIG. 5 presents the process of checking the objects attached to the winner object. A similar process is also used to check the object attached to the loser object as described below.

In explaining FIG. 5, conflict objects 1 and 2 above will be used to illustrate the various steps in the process. For purposes of this example, assume that conflict object 1 was selected as the winner object and conflict object 2 was selected as the non-winner or loser conflict object. Thus, the final conflict object will have a change number of A8, a union predecessor change list of A8, B14, C4, D6, and E3, and a time stamp of $T_1$. In addition, the winner object, represented in conflict object 1 by the attached object with a change number of A8, a predecessor change list of A8, B7, and D5, and a time stamp of $T_1$, will also be attached to the object as the winner object. Therefore, the initial portion of the conflict object created during the resolution of the conflict between object 1 and object 2 is:

| A8 | A8, B14, C4, D6, E3 | $T_1$ |
|----|---------------------|-------|
|    | A8 | A8, B7, D5 | $T_1$ |

FIG. 5 will now be used to illustrate how the objects attached to conflict object 1 will be traversed and how the decisions are made on which attached objects to keep and which attached objects to delete. As indicated in FIG. 5 by step 124, the first step is to skip the attached winner object. Referring back to conflict object 1, the list of attached objects always has as its first entry the attached winner object. Since this object is always kept, there is no need to check it, and it should simply be attached as indicated above. The next step is to retrieve the next attached object. This is indicated in FIG. 5 by step 126. Referring back to conflict object 1, the next attached object is the B14 object which has a predecessor change list of B14, and D5, and a time stamp of $T_2$.

After the appropriate object has been retrieved, the next step is to compare the attached object change number to the winner object union predecessor change list. This step is illustrated in FIG. 5 by step 128. In the case of attached object B14, the change number is B14, and the union predecessor change list of the winner object is A8, B14, D5, and E3. When change numbers are compared to entries in a predecessor change list, they are compared by first locating the common replica node ID portion of the change number. In the instant case, the replica node ID portion is represented by the letter B. After the replica node ID portion of the change number and predecessor change list entry have been matched, the local counter value portions are compared. This ensures that change numbers are always compared to entries in a predecessor change list which represent changes made by the same replica node. In the example of object B14 and winner object A8, the change number is B14, and the entry in the predecessor change list is also B14.

Once the attached object change number and the entry in the winner object predecessor change list have been compared, the next step is to extract the entry from the predecessor change list to use as the change number for the rest of the algorithm. This is illustrated in FIG. 5 by Step 130. Under some circumstances, it is possible that the entry in the winner object predecessor change list will be greater than the change number of the attached object or it is possible that there are multiple attachments from the same replica node with different change numbers. In the present example, the entry in the change list would be greater than the change number of the attachment if the entry in the winner object predecessor change list was B15 or higher. By using the entry from the predecessor change list as the change number for the remainder of the tests, the algorithm can properly identify which attachments should be kept and which should be deleted.

The next step is to compare the change number retrieved from the predecessor change list of the winner object to the predecessor change list of the object not selected as the winner object (e.g., the loser object). This is represented in FIG. 5 by step 132. In the present example, the loser object predecessor change list is the predecessor change list for conflict object 2, which is B14, C4, and D6. B14 is therefore also found in the predecessor change list of the loser object in this case.

Decision block 134 decides if the replica node ID portion of the change number is found in the predecessor change list of the non-winner object. In these examples, the letter portion of the change number is the replica node ID portion of the change number. In the present example, this block tests whether the non-winner predecessor change list contains a "B" entry. If the predecessor change list of the non-winner object does not have an entry with a corresponding replica node ID, then the attached object represents information that must be kept as illustrated by step 136 of FIG. 5. In this example, this would be the case if the predecessor change list for object 2 did not have a "B" entry. However, since the predecessor change list does have a "B" entry, execution proceeds to block 138.

Decision block 138 tests whether the retrieved change number is less than the entry found in the predecessor change list of the non-winner object. If the change number is less than the entry found in the predecessor change list, then the non-winner object contains all the information found in that attached object and the attached object can be deleted. This is indicated in FIG. 5 by step 140. In the present example, the change number retrieved from the predecessor change list of the winner object is B14, and the entry in the predecessor change list of the non-winner object (conflict object 2) is also B14. Where the retrieved change number and the entry in the non-winner predecessor change list are equal, execution proceeds to decision block 142.

Decision block 142 tests whether the retrieved change number is equal to the entry found in the non-winner predecessor change list. If the entries are not equal, then the retrieved change number must be greater than the entry found in the predecessor change list of the non-winner object. In such a case, the attached object is kept as indicated by step 136 of FIG. 5. If, however, the two numbers are equal, then a further test must be performed. In the present example, the retrieved change number is B14, and the entry in the predecessor change list of conflict object 2 is also B14. Execution thus proceeds to decision block 144.

Decision block 144 determines whether the winner object and the non-winner object have the same attached object. In the present example, this decision block tests whether conflict object 2 also has an attached object with a change number of B14. If both the winner object and the non-winner object have the same attached object, then the attached object represents conflict information that must be kept. This is indicated in FIG. 5 by step 136. If, on the other hand, the non-winner object does not have the same attached object, then the object can be safely deleted because the non-winner object contains all necessary conflict information, and when the objects attached to the non-winner object are checked, they will be kept. Deletion of the redundant information is indicated in FIG. 5 by step 140. In the present example, conflict object 2 does not have a B14 attached object, so the B14 attachment is deleted.

The algorithm then retrieves the next attached object if it is available, and if not, the algorithm ends. This is indicated in FIG. 5 by decision block 146. It should be noted that once all objects attached to the winner have been checked, the objects attached to the non-winner must also be checked.

The process in FIG. 5 can be modified from a process which checks objects attached to the winner to a process which checks objects attached to the non-winner by substituting occurrences of "winner" for "non-winner" or "loser" and by substituting occurrences of "loser" or "non-winner" for winner and performing the further modifications discussed in greater detail below.

Proceeding with the example of how a conflict between conflict object 1 and conflict object 2 would be resolved, the next attached object has a change number of E3. The E3 entry of the predecessor change list of conflict object 1 (the winner object) is extracted and used as the change number to compare against the predecessor change list of object 2 (the non-winner object). Execution would proceed to step 132. Since the E3 entry does not exist in the predecessor change list of conflict object 2 (the non-winner object), decision block 134 shifts execution to step 136 and the object is kept.

After the attached objects for conflict object 1 have been checked, the resultant conflict object looks like:

| A8 | A8, B14, C4, D6, E3 | $T_1$ |
|---|---|---|
| | A8 | A8, B7, D5 | $T_1$ |
| | E3 | B7, E3 | $T_3$ |

Once the attachments for the winner object have been checked, then the same process is performed for the attachments to the non-winner object. As previously indicated, some minor modifications must be made to FIG. 5 to check the non-winner object attachments against the winner object. Initially, all instances of "winner" in FIG. 5 are replaced with "non-winner" or "loser" and instances of "loser" or "non-winner" are replaced with "winner." The flow chart of FIG. 5 is then further modified by eliminating step 124. This step is not needed since the "winner" object has already been kept in the final conflict object. Finally, block 144 is eliminated and the "Y" branch of block 142 is connected directly to block 140. Block 144 is not needed since any attachments that are common to both the winner object and the non-winner object and that meet all the preceding tests would have already been kept during the process which checks the attachments to the winner object.

According to the modified flow chart of FIG. 5, the process proceeds to check the first attached object to conflict object 2, which is object D6. By modifying FIG. 5 as indicated above, the predecessor change list of the non-winner object (object 2) is first checked for an entry corresponding to D6. Conflict object 2 has a D6 entry in the union predecessor change list, so the change number D6 is extracted from the predecessor change list of the non-winner object and compared to the predecessor change list of the winner object. Conflict object 1 has an entry D5. Thus, the node ID for the change number is found in the predecessor change list of conflict object 1, so execution would proceed through a decision block analogous to decision block 134 to a decision block analogous to decision block 138 of FIG. 5. Since the change number of the attached object is greater than the entry found in the predecessor change list of conflict object 1, execution would proceed through this decision block to a decision block analogous to decision block 142 and then to step 136 which indicates that the entry should be kept.

A similar process occurs for attachment C4 with a decision block analogous to decision block 134 indicating that the attachment should be kept. Thus, after all attachments of the winner object (conflict object 1) and the non-winner object (conflict object 2) have been checked, the resultant conflict object is:

| A8 | A8, B14, C4, D6, E3 | $T_1$ | |
|---|---|---|---|
| | A8 | A8, B7, D5 | $T_1$ |
| | E3 | B7, E3 | $T_3$ |
| | D6 | B14, D6 | $T_5$ |
| | C4 | B3, C4 | $T_6$ |

Analyzing the information contained in conflict object 1 and conflict object 2 and the information maintained in the resultant conflict object shown above, we can see that attached object B14 has been eliminated. It is easy to see that attached object D6 completely contains all the information in attached object B14. Attached object B14 thus represents redundant information and can be deleted.

The above description illustrates how a conflict between two conflict objects are resolved. When a conflict arises between a conflict object and another object which is not a conflict object, the conflict is resolved essentially as described above, with minor modifications. A conflict between two conflict objects is resolved by first checking the attachments of the winner against the non-winner and then checking the attachments of the non-winner against the winner. When one object is a conflict object and the other is not a conflict object, then the conflict is resolved by checking the attachments of the conflict object against the other object in the proper sequence.

For example, suppose the conflict object was selected as the non-winner object. In this case, the winner object would not be a conflict object. Therefore, after creating the union predecessor change list as previously described, the winner object would be attached to itself. This process was described above in conjunction with creating a conflict object when resolving a conflict between two nonconflict objects. Then, after modifying the flow diagram of FIG. 5 for processing the attachments of non-winner objects, the attachments of the non-winner object are checked against the winner object. For example, suppose object 3 is:

| A8 | A8, B3, C4, D5, E3 | $T_1$ |
|---|---|---| and object 4 is:

| D6 | B14, C4, D6, | $T_5$ | |
|---|---|---|---|
| | D6 | B14, D6 | $T_5$ |
| | C4 | B3, C4 | $T_6$ |

In a conflict between object 3 and object 4 where object 3 was selected as the winner, the resultant conflict object would be:

| A8 | A8, B14, C4, D6, E3 | T₁ |
|----|---------------------|----|
|    | D6 | A8, B3, C4, D5, E3 | T₁ |
|    | C4 | B14, D6 | T₅ |

As another example, consider the case where the winner object is a conflict object and the non-winner object is not a conflict object. In this case, the attachments of the winner would be checked against the non-winner object according to the process of FIG. 5. When the non-winner object is not a conflict object, the test of block 144 will always lead to block 140 since the non-winner object has no attachments.

After the attachments of the winner object are checked, then the non-winner object is attached to the winner object. In a conflict between object 3 and object 4 above where object 4 was selected as the winner, the resultant conflict object would be:

| D6 | A8, B14, C4, D6, E3 | T₅ |
|----|---------------------|----|
|    | D6 | B14, D6 | T₅ |
|    | A8 | A8, B3, C4, D5, E3 | T₁ |

As will become apparent hereafter, the conflict resolution process of the present invention ensures that all replica nodes in the enterprise which recognize a conflict between two copies of the same data object will generate the same conflict object without the need to exchange any information beyond what is normally replicated. This provides a dramatic advantage over schemes which use arbitration or a central location to resolve conflicts. The conflict object looks identical to a normal data object except that the conflict object has attached thereto other data objects. Thus, the conflict object can behave exactly like a normal data object. The conflict object can, for example, be replicated across a network, be used in further conflict detection and resolution, and so forth. Thus, once the conflict object has been created, it is not necessary to take immediate steps to achieve final resolution of the conflict between the winner copy and the non-winner copy. In this context, final conflict resolution means ultimately deciding which copy of the data object should be kept and which copy should be deleted or, possibly, creating a third separate copy of the data object using a combination of any previous copies.

The ability to delay final resolution of any discovered conflicts has several advantages not present in prior systems. One advantage of the ability to delay final conflict resolution is that processing and access to the object does not need to be suspended while conflict resolution takes place. Perhaps, however, the greatest advantage of delaying final conflict resolution is that no information need be transferred among the enterprise if final conflict resolution is to take place only on a particular replica node. This can, perhaps, best be illustrated by considering creation of the conflict object. Because the conflict resolution process of the present invention is designed to allow each replica node to create an identical conflict object when a conflict is identified between two copies of the same data object, such a conflict object will eventually reside on each and every replica node. This is because, due to normal data replication, the copies of the data object which are in conflict will eventually be replicated to all replica nodes. Each replica node will then recognize the conflict which exists and create the conflict object. Thus, if a single replica node is designated as the location to perform final conflict resolution for that data object, either through automated means or through user intervention, then conflict resolution can be delayed until a conflict object has been created on that replica node. Thus, the designated final conflict resolution node discovers the conflict with no additional message traffic. Final conflict resolution is, therefore, contemplated and it should be clear that embodiments within the scope of this invention can comprise means for final conflict resolution.

From the above discussion, it should be clear that final conflict resolution can occur at any replica node. In some embodiments, it may be desirable to only initiate final conflict resolution at certain designated nodes, such as a particular replica node designated as the "home server" for a data object. In other embodiments, it may be desirable to allow any replica node to initiate final conflict resolution.

Returning now to FIG. 4, the ability to delay final conflict resolution is identified by decision block 56 which determines whether final conflict resolution should be initiated. If not, then the process terminates. If, however, final conflict resolution should be initiated, then process proceeds with the steps enclosed within dashed line 58. The steps enclosed within dashed line 58 represent but one example of the means for final conflict resolution. The steps in FIG. 4 used to represent an example of the means for final conflict resolution are enclosed by dashed line 58 for two reasons. The first is to recognize that the means for final conflict resolution can comprise any suitable method for finally resolving the conflict between the data objects. For example, the means for final conflict resolution may be automated as previously described such as, for example, creating a red-lined version of a word processing document possibly identifying which changes were made by various individuals or locations. In the alternative, the means for final conflict resolution may be achieved through user intervention. For example, various versions of the data object can be presented to the user and the user can select one of the versions and delete the others or the user can combine them into a final version which should be used.

The second reason that the steps illustrating final conflict resolution in FIG. 4 are enclosed within dashed line 58 is that final conflict resolution may be distributed throughout the enterprise. For example, rather than wait until a conflict object is created on each and every replica node, the means for final conflict resolution can comprise means for notifying one or more owners of the data object that a conflict exists. The means for notifying may comprise, for example, a conflict notification which is sent to the owner of an object by any replica node which recognizes the conflict. The means for final conflict resolution can also comprise means for presenting to an owner of the data object the conflicts which exist. By way of example, and not limitation, the owner can request that the various versions of the object be presented. This may entail transferring the conflict object from one location in the network to another if the conflict object does not reside on the appropriate replica node. In addition, other combinations may be used. For example, the means for final conflict resolution can comprise a combination automated resolution and user resolution. Such a combination can be, for example, a red-lined version of the conflict object which is created and then presented to the user for review and further modification. Although the automated conflict resolution has been presented in terms of red-lining a word processing document, such should not be construed as limiting of the scope of this invention. Other methods of presenting and resolving conflicts for different types of data objects can be created. Spread sheets, data bases, data files, and the like each have an analogous function to red-lining.

Returning now to FIG. 4, one example of the means for final conflict resolution is presented. This example should not be construed as limiting the scope of this invention. In FIG. 4, when final conflict resolution is initiated, the first step is to send conflict notification to the owner of the data object. This step is an example of the means for notifying one or more owners or other individuals that a conflict exists and is represented in FIG. 4 by step 60. Sending conflict notification to an owner of the data object may be as simple as displaying information on the computer screen of the local replica node. Sending notification to an owner of the data object may also be more complicated such as creating an E-mail message and delivering it to the MTA to be delivered to the owner of a data object. A combination of methods may also be utilized. How an owner is notified of a conflict is solely a function of how soon the conflict should be resolved and the resources available. For example, if the system is set up so that conflicts are immediately resolved, then means can be employed to track down and notify the owner of the data object wherever they happen to be connected to the replication enterprise. If, however, an owner of the data object is not connected to the enterprise, then perhaps notification by E-mail or other means would be appropriate.

When notification is sent to the owner, care must be taken not to send the owner multiple notifications of the same conflict. Because each replica node will recognize the same conflict and create the same conflict object, an owner could receive multiple notifications if every replica node sent notifications to the owner. It may be desirable, therefore, to designate a single replica node to send conflict notification to the owner. In one preferred embodiment, only the "home server" will send conflict notification to the owner. In this context, the home server is a particular replica node designated as the "home" of the data object. In other embodiments, other criteria could be used to designate the server responsible for notifying the owner of a conflict.

As used within the context of this invention, the owner of a data object is simply a user who is responsible for the data object. The term is intended to be interpreted broadly and may include not only owners in the sense of the individual who initiated or created the data object, but may also include a list of two or more users who either have responsibility for the data object or who have made modifications to the data object.

After the owner has been notified, the next step is to present the conflict options to the owner. This is an example of the means for presenting to an owner of a data object the conflicts that exists and is indicated in FIG. 4 by step 62. As previously discussed, in presenting conflict options to the owner, many different methods can be utilized. For example, a list of the objects may be presented. This list may be developed, for example, from the objects attached to the winner object as previously discussed. As another example, the data objects themselves may be displayed in a side-by-side fashion so that the owner can ascertain differences. As another example, a red-lined version may be presented to the owner. As still another example, conflict options may be presented in a side-by-side or other manner so that the differences can be highlighted. Perhaps with some types of data, an overlay would be the best way to present the data to the user. As can be seen from this non-exhaustive list, many methods can be developed to present conflict options to the owner in a way which will allow the owner to quickly and easily determine which version of the object should be kept and which version should be deleted. In addition, editing tools allowing the owner to modify the object may be included. All these are examples of the means for presenting to an owner the conflicts that exist.

After the owner has created or selected a final version of the object which resolves the conflicts, then the next step is to update the object. Thus, embodiments within the scope of this invention can comprise means for updating the conflict object. By way of example, this is represented in FIG. 4 by step 64. In updating the object, care should be taken to update the object in such a way that when the updated object is replicated via the normal replication process, the updated object wins over all remaining conflict objects. Thus, if the updated object contains a new change number, the union predecessor change list, and an updated time stamp, then when the object is replicated throughout the enterprise, the conflict resolution process will ascertain that no conflict exists between the updated object and the remaining conflict objects. The updated object will then replace the conflict objects and will win over the conflict objects as it is replicated throughout the enterprise. As a final point, since the object has been updated and the conflict has been resolved, any attached objects can be, and should be, deleted from the updated object.

The above conflict resolution description has been primarily directed to data objects. If, however, replication processing block 32 of FIG. 3 also replicates properties of data sets, then a conflict resolution process must exist for conflicts which arise when the properties of data sets are replicated.

Properties of data sets describe a data set. The group of properties useful or needed to describe a data set is, therefore, closely tied to the exact implementation of the replication process. Properties can include such information as the data set name and/or other ID value, access control information for the data set and/or data set properties. In addition, other information can be included for use with other replication functions. For example, copending U.S. patent application Ser. No. 08/670,588, entitled "System and Method for Discovery Based Data Recovery in a Store and Forward Replication Process" (hereinafter referred to as the "Backfill Application") utilizes change sets to discover missing data. Such change sets may also be included. In one implementation of a store and forward replication process directed to replication of hierarchically structured data that is described in the copending "Hierarchical Data Replication Application (previously incorporated herein by reference), the data set properties comprise:

| Data Set Name | Data Set ID | Parent ID | Replica List | Change Number | Predecessor Change List | Time Last Modified |
|---|---|---|---|---|---|---|

The data set name is the name of the data set which is displayed to a user. The data set ID is an identifier that uniquely identifies the data set. Such an ID can be a FUID value, as described previously. Since the data is hierarchical in nature, the parent field is the ID of the parent. The replica list is the list of replica nodes with a populated data set. The change number, predecessor change list, and time last modified have been described previously and perform the same functions as previously described.

Regardless of the type of properties desired or required by the replication process, for conflict detection and resolution it is preferred that the change number, predecessor change list and time last modified properties be included. These three fields aid greatly in conflict detection and resolution.

Figure 6:
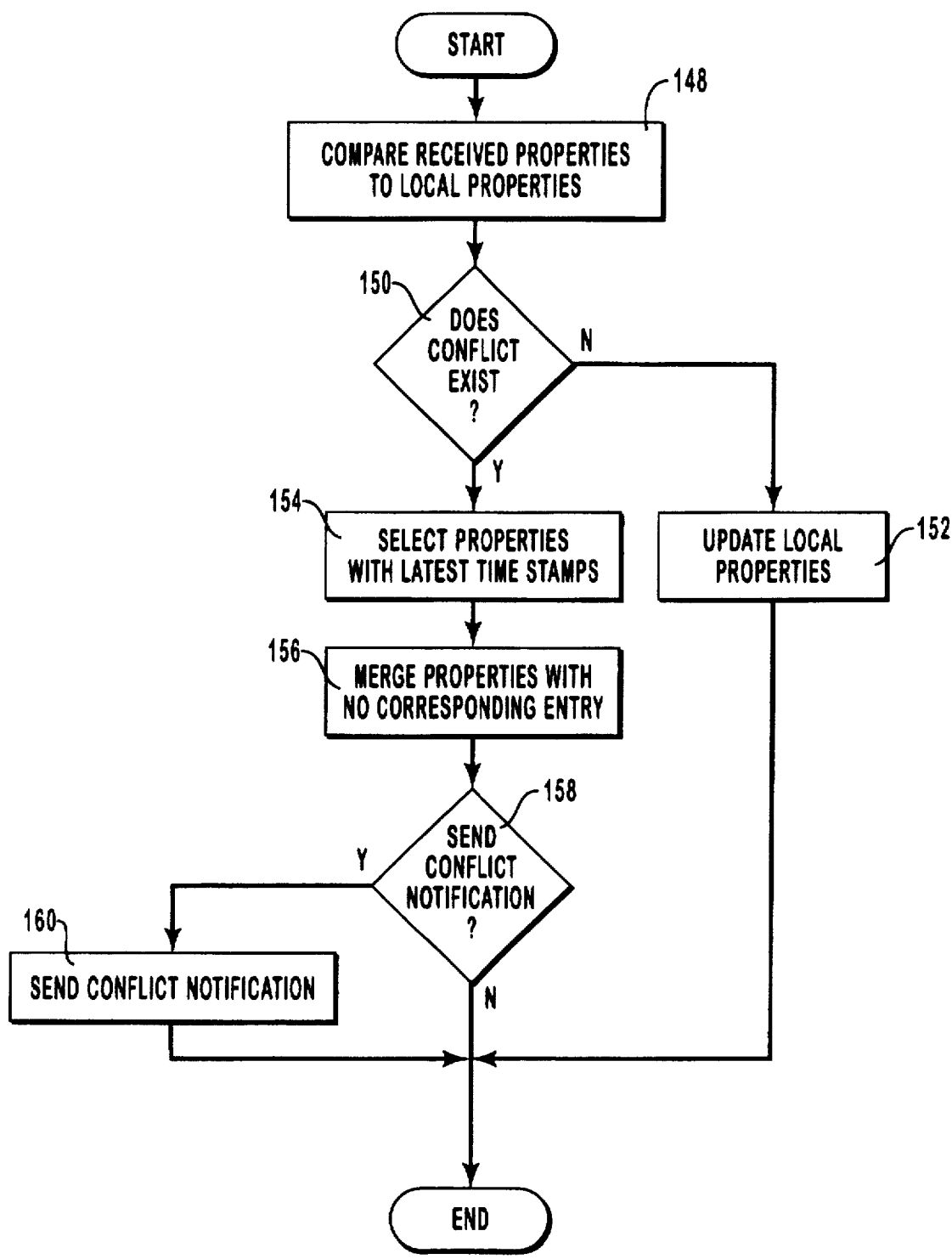
FIG. 6 is a flow diagram illustrating one embodiment of distributed conflict resolution for data set properties.

Turning now to FIG. 6, a flow diagram of one conflict detection and resolution process for data set properties is presented. As illustrated by step 148 and decision block 150, the first step is to determine if a conflict exists between the received data set properties and the data set properties stored locally. This can be done, as explained previously in conjunction with step 46 and decision block 48 of FIG. 4, by comparing the predecessor change list of the received data set properties to the predecessor change list of the locally stored data set properties. In fact, any conflict detection process used for detecting conflicts between data objects should work with little or no modification for detecting conflicts between data set properties.

If no conflict exists, then the locally stored data set properties are replaced by the received data set properties if the received data set properties are a later version of the locally stored data set properties. If the locally stored data set properties are newer, then the received data set properties are discarded. In either case, the process ends. This is illustrated in FIG. 6 by step 152.

If a conflict exists, however, then the conflict must be resolved. One way of resolving conflicts between data set properties would be to use the attachment model previously described However, for a variety of reasons, it may not be desirable to postpone final conflict resolution of data set properties. Some data set properties may be somewhat time sensitive in the sense that it is important to have all copies of the data set properties for a particular data set be the same as quickly as possible. Furthermore, it may be desirable to have a certain "definiteness" to the properties so that the values of the properties are not ambiguous. For reasons such as these, it may be desirable to finally resolve conflicts as they are recognized.

If a conflict exists, then the first step in resolving the conflict is to select as the "winner" properties those properties with the latest time stamp. Embodiments within the scope of this invention can, therefore, comprise means for placing in a winner copy of the object those properties having the latest associated time stamp. By way of example, and not limitation, in FIG. 6 such means is illustrated by step 154. In keeping with the distributed conflict resolution model, each replica node should be able to resolve conflicts as they are recognized. Step 154 accomplishes this function.

Note that if the time stamp applies to all data set properties, then all data set properties will be taken from one of the data set property objects. For example, consider the data set property object presented previously comprising:

| Data Set Name | Data Set ID | Parent ID | Replica List | Change Number | Predecessor Change List | Time Last Modified |

If a conflict exists between two such data set property objects, the one with the later time stamp will completely replace the other. In some situations, this may not be adequate and a finer "granularity" may be needed. In such a situation, it may be desirable to place a time stamp (time last modified) on more than one property so that the replacement procedure will take the latest of each of the properties from both data set property objects.

As an example, consider the contents of the replica list property disclosed in copending U.S. patent application Ser. No. 08/679,054, entitled "Replica Administration Without Data Loss in a Store and Forward Replication Enterprise," incorporated herein by reference. In that application, each entry in the replica list includes a replica node ID which identifies a replica node that has a copy of the populated data set and a replica state which indicates the level of participation of that replica node in the replication of the populated data set. For example, the replica state could be "active" indicating active participation, the replica state could be "deleted" indicating that the local copy of the populated data set had been deleted, or some other intermediate state indicating that the local copy of the populated data set was in the process of being deleted. In such a situation, it is important that the latest replica state for each replica list entry be preserved. To accomplish this, it may be desirable to add a time last modified time stamp to each entry. Each entry in the replica list would then comprise:

| Replica Node ID | Replica State | Time Last Modified |

Such a scheme would allow each entry in the replica list to be compared to each entry in the replica list of a conflicting data set property object and the latest entry of either list to be selected and incorporated in the final replica list.

After the properties with the latest time stamp have been selected, the next step in FIG. 6 is to merge properties with no corresponding entry in the conflicting object. Embodiments within the scope of this invention can, therefore, comprise means for placing in the winner copy of the replica object those properties from either copy of the replica object (e.g., the received copy or the locally stored copy) that have no corresponding entry in the conflicting object. By way of example only, this is illustrated in FIG. 6 by step 156. The purpose of this step is to properly handle data set properties such as replica lists where the number of entries in each data set property object can be different. For example, suppose one data set property object had an entry in the replica list property for replica node B but the other data set property object had no corresponding entry. If the replica lists were not merged as indicated in step 156, the B entry may be lost. In some implementations, this may not be acceptable.

Since the conflict is being finally resolved and not delayed as in the resolution scheme presented previously for data objects, it may be desirable to send the owners of the data object and/or other individuals notification of the conflict and its resolution. This notification is illustrated by decision block 158 and step 160 of FIG. 6. Such notification can include any information desired and may range from a simple message stating that a conflict was noted and resolved to a message including the details of what the conflict was and exactly how it was resolved, what information was kept, what information was replaced, and the like. In one embodiment notification is sent to the individuals who made the changes that created the conflict and to the owners of the data object.

As with conflict notification in the case of conflicts between data objects, care must be taken not to send multiple conflict notifications to any single user or groups of users. It may, therefore, be desirable to designate one server as the data object's "home server" and allow only the home server to send conflict notification to the owner of a replica object.

A simple example will help illustrate how the process of FIG. 6 works. Suppose two data set property objects (having the format previously described) are in conflict, where object 1 is:

| Sports | F305 | A7 | A | Active  | $T_1$ | G10 | A20, B17, F500, G10 | $T_7$ |
|--------|------|----|----|---------|-------|-----|---------------------|-------|
|        |      |    | D | Deleted | $T_2$ |     |                     |       |
|        |      |    | G | Active  | $T_3$ |     |                     |       |
|        |      |    | H | Active  | $T_5$ |     |                     |       |

In this object, sports is the data set name. The data set ID is F305. A7 is the parent ID. The replica list has 4 entries: replica node A in an active state with a time last modified of $T_1$; replica node D in a deleted state with a time last modified of $T_2$; replica node G in an active state with a time last modified of $T_3$ and replica node H in an active state with time stamp $T_5$. G10 is the change number of the data set property object. The predecessor change list is A20, B17, F500, G01. The time last modified stamp is $T_7$.

Object 2 is:

| Basketball | F305 | A7 | A | Active | $T_1$ | C8 | A20, B17, C8, F500 | $T_8$ |
|------------|------|----|----|--------|-------|----|--------------------|-------|
|            |      |    | D | Active | $T_4$ |    |                    |       |
|            |      |    | G | Active | $T_3$ |    |                    |       |

In object 2, the name is basketball. The data set ID and parent ID are F305 and A7 respectively. The replica list has 3 entries: replica node A in an active state with time stamp $T_1$; replica node D in an active state with time stamp $T_4$; replica node G in an active state with time stamp $T_3$. The change number is C8 and the predecessor change list is A20, B17, C8, F500. The time last modified is $T_8$.

Assume that the higher number time stamps occurred later in time so that $T_8$ is the latest time stamp and $T_1<T_2<T_3<T_4<T_5<T_7<T_8$. Then following the process of FIG. 6, the first step is to determine if a conflict exists (step 148 and decision block 150 of FIG. 6). As previously described, a conflict can be identified by comparing the predecessor change lists. In this case, the predecessor change list of object 1 has change G10, not found in object 2 and the predecessor change list of object 2 has change C8, not found in object 1. A conflict thus exists.

Step 154 indicates that we first select properties with the latest time stamp. The $T_7$ time stamp of object and the $T_8$ time stamp of object 2 apply to all properties except the replica lists, which are time stamped separately. Since $T_8$ is later than $T_7$, we thus take the basic properties, except for the replica list, from object 2. Thus, the name is basketball, the data set ID is F305 (the same in both objects), the parent is A7 (also the same in both objects).

When deciding how to update the change number, the predecessor change list and the time last modified time stamp, care must be taken not to introduce unintended effects. For example, it would be possible to simply take the change number, the predecessor change list and time stamp from the "winning" data set property object (object 2 in this case). Such a scheme, however, gives no indication that the data set property object created as a result of the resolution of the conflict between the two objects is any different from either one of the previous two objects. Perhaps for some implementations, this would be entirely adequate. In most implementations, however, it would probably not be adequate.

A second possibility is that each replica node assigns a new change number, time stamp, and updates the predecessor change list. Such a scheme would result in a different change number for identical objects since each replica node that recognizes the conflict would independently resolve it and assign a different change number. This would create several undesirable effects and would not be acceptable.

Still a third possibility is to utilize a scheme like is used in resolving conflicts between data objects and take the time stamp and change number from the winner object and use the union of the two predecessor change lists from the two objects. This is probably the best alternative of the three presented here since it provides some indication of the changes that are part of the finally resolved conflict. Using this option, the change number would be C8, the time stamp $T_8$, and the predecessor change list A20, B17, C8, F500, G10.

The next step is to select the latest individually time stamped properties. In our example, this refers to the replica list entries. Examining the replica list entries for object 1 and object 2, we see that the entries for replica nodes A and G are the same. These entries will thus be kept and moved to the new object. Note that the replica node D entry of object 2 is time stamped later than the replica node D entry of object 1 ($T_4>T_2$). Step 154 of FIG. 6 indicates that the D entry of object 2 will be used and not the D entry of object 1.

Finally, object 1 has an entry for replica node H that has no corresponding entry in object 2. In this case, step 156 of FIG. 6 indicates that the entry for replica node H should be kept and moved to the new object. After all conflicts are resolved, the new object is:

| Basketball | F305 | A7 | A | Active | $T_1$ | C8 | A20, B17, C8, F500, G10 | $T_8$ |
|------------|------|----|----|--------|-------|----|-------------------------|-------|
|            |      |    | D | Active | $T_4$ |    |                         |       |
|            |      |    | G | Active | $T_3$ |    |                         |       |
|            |      |    | H | Active | $T_5$ |    |                         |       |

After the new object is created, notification may optionally be sent as illustrated in decision block 158 and step 160 and as previously described.

As described, the conflict resolution process fulfills the goals of the invention and has several key advantages not found in the prior art. For example, conflict resolution can occur with little or no additional communication traffic throughout the replication enterprise. The final resolution of conflicts can be delayed which allows processing to continue normally until the conflict is finally resolved. The conflict resolution process is distributed such that all replica nodes in the enterprise which recognize the conflict will create an identical conflict object. The order in which conflicts are resolved is irrelevant and the process will properly create an appropriate conflict object and initiate final conflict resolution independent of the order that conflicts are resolved. Finally, as will become apparent hereafter, the process inherently handles multi-way conflicts appropriately.

4. Conflict Resolution Examples

In order to more fully illustrate the concepts of the present invention, this section presents two examples of conflict resolution for data objects. The first example is a conflict between two copies of the same data object and the second example is a multi-way conflict between multiple copies of the same data object.

Figure 7:
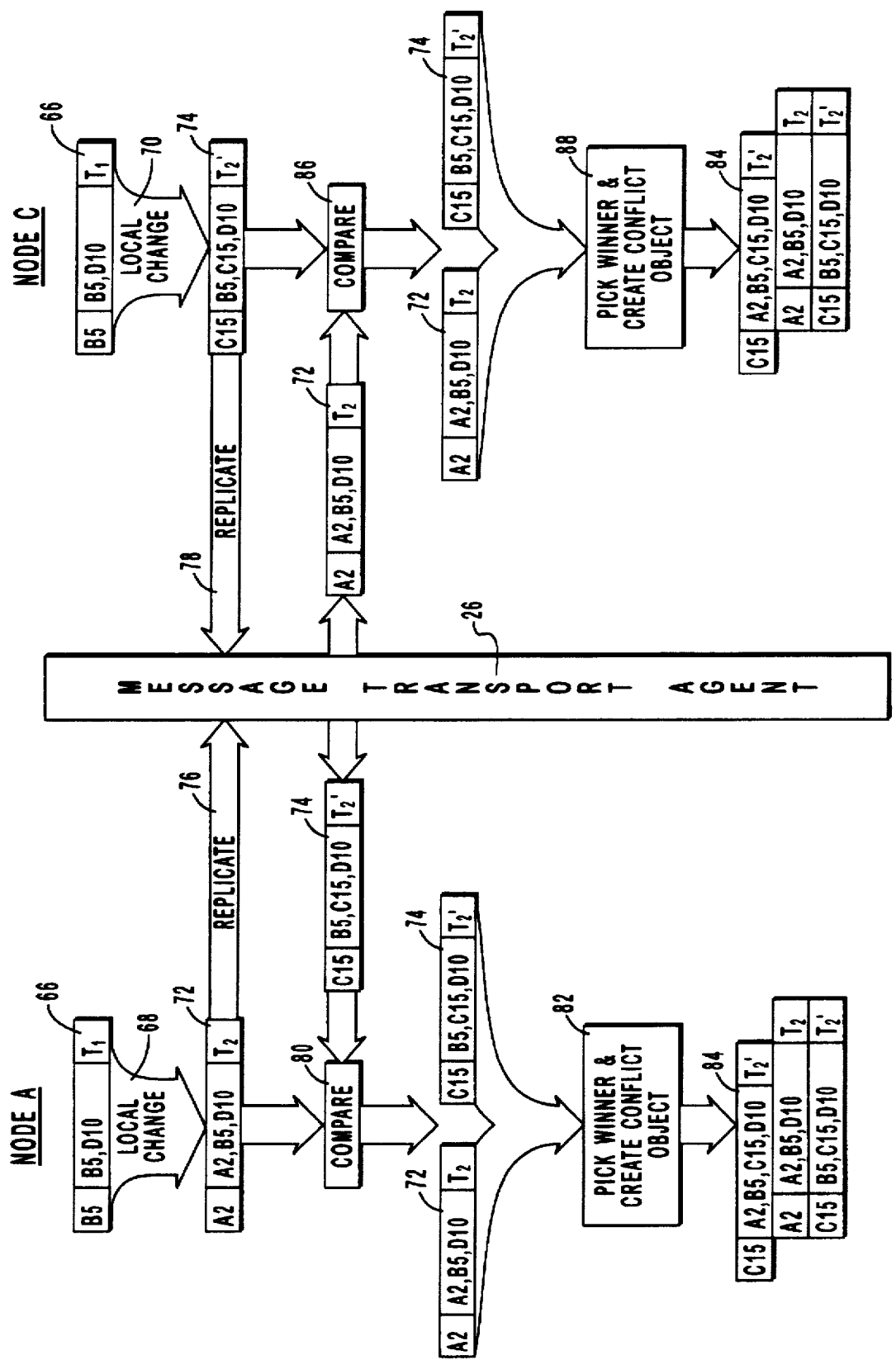
FIG. 7 is a diagram illustrating identification and resolution of a conflict between two systems.

Referring first to FIG. 7, an example of conflict resolution between two copies of the same data object on two different replica nodes is illustrated. Initially, assume that replica node A and replica node C possess the same version of a data object. In FIG. 7, this is illustrated by copy 66 of the data object. Now assume that node A and node C simultaneously change data object 66 as indicated by local change arrows 68 and 70. On node A this results in copy 72 of the data object which has a change number of A2, a predecessor change list of A2, B5, and D10, and a time stamp of $T_2$. On node C, the local change results in copy 74 of the data object with a change number of C15, a predecessor change list of B5, C15, and D10, and a time stamp of $T_2'$. The changes to these copies of the data object will be replicated by the replication process as indicated by replication arrows 76 and 78.

Focusing first on replica node A, when copy 74 is received at replica node A, in conformity with the conflict resolution process illustrated in FIG. 4, replica node A will compare copy 72 to copy 74 in order to determine if the two copies of the same data object are in conflict. This is illustrated in FIG. 7 by compare block 80. An examination of the predecessor change list of copy 72 and copy 74 reveals that a conflict exists since change A2 is found in copy 72 and is not found in copy 74 and change C15 is found in copy 74 and is not found in copy 72.

Since a conflict has been identified, the next step is to select a winner copy of the data object and create the conflict object. In FIG. 7, block 82 takes copy 72 and copy 74 and selects a winner object and creates conflict object 84. For the purposes of this example, assume that time stamp $T_2'$ is later than time stamp $T_2$. If this is the case, then copy 74 would be selected by block 82 as the winner object in conformity with the process disclosed in this application. As indicated in FIG. 7, conflict object 84 would thus contain as the winner object the version of the data object contained in copy 74. This is indicated in conflict object 84 by the first element having a change number C15. The winner object would also have a predecessor change list representing the union of the predecessor change lists of copy 72 and copy 74 (A2, B5, C15, and D10), and time stamp $T_2'$. Attached to this winner object is copy 72 and original copy 74.

As indicated in FIG. 7, replica node C will perform a similar process and arrive at the identical conflict object. This is shown in FIG. 7 by compare block 86 which recognizes the same conflict between local copy 74 and received copy 72. Block 88 then compares the time stamps of copy 72 and copy 74 and selects copy 74 as the winner and creates the identical conflict object 84.

The proceeding example clearly illustrates how an identical conflict object is created on all replica nodes without the exchange of any information beyond what is normally replicated by the replication process employed in the enterprise. To pursue the example a little further, either replica node A or replica node C can then initiate steps for final conflict resolution as previously described, either through a fully automated process, or through user intervention, or through a combination of automated resolution and user resolution.

Figure 8:
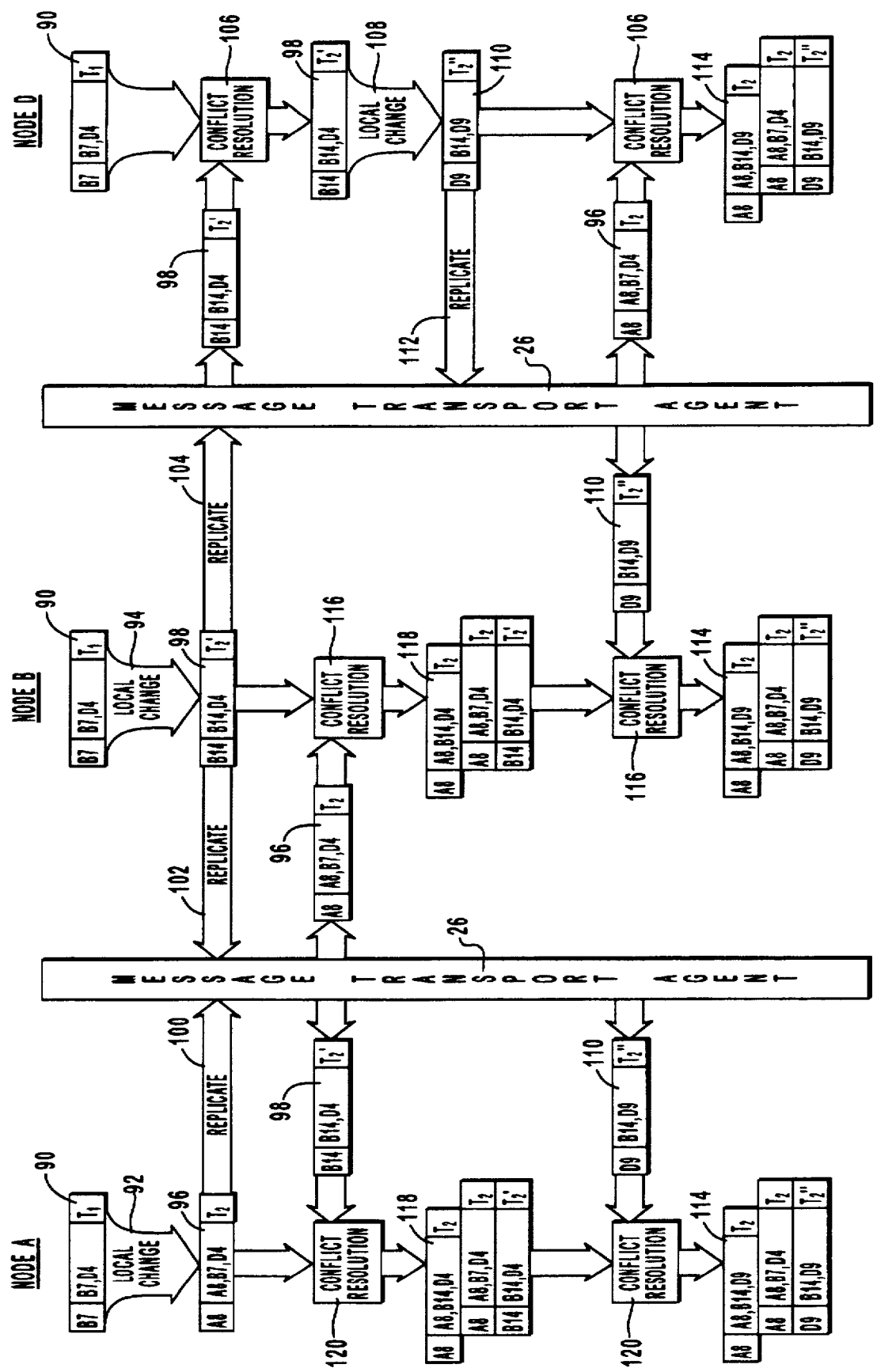
FIG. 8 is a diagram illustrating identification and resolution of a conflict between three systems.

Turning next to FIG. 8, an illustration of a multi-way conflict between three replica nodes is illustrated. As in the previous example, suppose that initially each replica node possessed an identical copy 90 of the data object. As indicated in FIG. 8, copy 90 has a change number of B7, a predecessor change list of B7, D4, and a time stamp $T_2$. Now suppose that replica node A and replica node B simultaneously change copy 90 as indicated by local change arrows 92 and 94. On node A this results in a copy of the data object 96 with change number A8, predecessor change list A8, B7, and D4, and time stamp $T_2$. On replica node B this results in copy 98 with change number B14, predecessor change list B14, D4, and time stamp $T_2'$. With respect to copy 98, notice that because of the way change numbers are assigned, the predecessor change list need not contain both B14 and B7. This is because a data object having a change number of B14 necessarily is based on all previous B change numbers. Copy 96 and copy 98 of the data object are replicated to other nodes as indicated by replication arrows 100, 102, and 104.

Next, suppose that simply due to routing delays within message transport agent 26, copy 98 arrives first at replica node D. The conflict resolution process, illustrated in FIG. 8 by conflict resolution block 106, will then compare copy 98 to original copy 90 to determine if a conflict exists. Because the predecessor change list of copy 98 contains all changes in predecessor change list in copy 90, no conflict between the two objects exists and conflict resolution block 106 will simply replace copy 90 with received copy 98.

Continuing with events at replica node D, suppose that replica node D then changes copy 98 as indicated by local change arrow 108. The resultant copy of the data object 110 has change number D9, predecessor change list B14, and D9, and time stamp $T_2''$. This copy is then replicated by the replication process as indicated by replication arrow 112.

A quick examination of FIG. 8 will reveal that at this point in the example there are three different copies of the original data object circulating, each copy representing a different version of the data object. Continuing on with the events at replica node D, suppose that copy 96 is next received via message transport agent 26. The conflict resolution process, again indicated by conflict resolution block 106, will compare copy 96 to copy 110. Because copy 96 contains a change not found in copy 110 (change A8) and copy 110 contains two changes not found in copy 96 (changes B14, and D9), a conflict exists between the two copies. Suppose, due to time clock misalignment that time stamp $T_2$ was later than time stamp $T_2$. In such an instance, conflict resolution block 106 would produce conflict object 114 as indicated.

Returning next to the events happening on replica node B, it will be seen that an identical conflict object is created, although through a vastly different sequence of events. When copy 96 is received by replica node D, the conflict resolution process, illustrated in FIG. 8 by conflict resolution block 116 will compare copy 96 with copy 98 and recognize a conflict between them. Suppose, that time stamp $T_2$ was later than time stamp $T_2'$. In such an instance, conflict object 118 would be created.

When copy 110 is received by replica node B, the conflict resolution process, again illustrated by conflict resolution block 116, will recognize a conflict between conflict object 118 and copy 110. This is because the winner object is based on a change not represented in copy 110 (change A8) and copy 110 is based on changes not found in the winner copy of conflict object 118 (change D9). Because, as indicated above, time stamp $T_2$ is later than time stamp $T_2''$, the object with change number A8 will be picked as the winner object and conflict object 114 will be created. Note that in creating object 114, it is unnecessary to maintain copy 98 as attached to conflict object 118. This is because received copy 110 contains all changes in, and supersedes, copy 98. Applying the process illustrated in FIG. 5, when attached object B14 is compared to the predecessor change list of object 110, we see that B14 exists as an entry in the predecessor change of copy 110. The flow diagram of FIG. 5 indicates that in such a situation, attached object B14 is deleted. When object D9 (copy 110) is compared to the predecessor change list of object 118, D9 is greater than D4, so D9 will be attached to the created conflict object 114. Thus, in conflict object 114, copy 110 has replaced attached copy 98. This makes intuitive sense because copy 98 was in conflict with conflict object 118 so copy 98 must contain changes not found in conflict object 118 or any of its attached objects. If this were not the case, copy 98 would not be in conflict with object 114.

Finally, examining the events on replica node A, again it will be seen that an identical conflict object is ultimately created. When replica node A receives copy 98, the conflict resolution process, illustrated by conflict resolution block 120 will recognize the conflict between copy 96 and copy 98. This is the same conflict recognized by replica node B and described previously. Conflict resolution block 120 will, therefore, resolve the conflict in the same way as replica node B and produce conflict object 118.

When copy 110 is received, the conflict resolution process, again illustrated by conflict resolution block 120, will recognize the conflict between copy 110 and conflict object 118. This conflict was also previously recognized by replica node B. Conflict resolution block 120 will resolve the conflict between conflict object 118 and copy 110 in the same way that replica node B resolved the conflict. As a result, conflict object 114 is created.

This example illustrates how multi-way conflicts among several nodes are resolved in the same manner regardless of the order that replication messages are received. Thus, the order of conflict resolution is unimportant and all replica nodes on the replica list for a particular replica will eventually identify and resolve conflicts in such a manner as to create the same conflict object. As previously described, any or all of the replica nodes can be configured to initiate final conflict resolution.

In summary, the present invention provides a system and method for resolving conflicts between different versions of the same data object replicated across an enterprise. The conflict resolution process is distributed in nature such that conflicts will be identified and resolved in exactly the same manner at each replica node regardless of the order that data is received. Furthermore, the conflict resolution process of the present invention can identify and resolve conflicts with little or no increased message traffic. The conflict resolution process of the present invention can also be adapted to work with any resolution process.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network comprising a plurality of nodes each of which can make changes to local copies of a replica object and each of which transmit any changes made to other nodes in the network, a method for each node (1) to independently detect conflicts that arise when two or more copies of the replica object are changed to introduce conflicts and (2) to take steps to resolve the conflicts without interrupting normal operation of the network the method comprising the steps of:

keeping at a local node a local copy of the replica object and a local change history comprising globally unique change numbers that together identify all changes that have been made to said local copy, whether at said local node or at other nodes in the network;

receiving, from another node in the network, at least one message comprising a received copy the replica object and a received change history;

detecting if a conflict exists between said received copy and said local copy and taking steps to resolve any detected conflict without interrupting normal operation of the network by performing at least the steps of:

comparing said received change history with said local change history and declaring a conflict only if one of either said received change history or said local change history does not contain all the changes of the other;

if a conflict is declared then creating a new copy of the replica object that can be changed and transmitted to other replica nodes without interrupting normal operation of the network by performing at least the steps of:

executing a predetermined sequence of steps that deterministically select one of either said received copy or said local copy as a winner copy; and attaching the copy not selected as the winner copy to the winner copy; and if a conflict is not declared, then replacing said local copy with said received copy if said received copy contains all changes of said local copy, otherwise discarding said received copy and retaining said local copy.

2. A method for discovering and resolving conflicts as recited in claim 1 wherein each node in the network has a unique ID and wherein the local copy of the replica object and the received copy of the replica object each have a time stamp and wherein the predefined sequence of steps comprises:

selecting, as the winner copy, the copy of the object with the later time stamp; and selecting, as the winner copy, the copy of the object which was changed by the node with the largest unique ID, if the time stamps of the received copy of the replica object and the local copy of the replica object are the same.

3. A method for discovering and resolving conflicts as recited in claim 1 further comprising the step of attaching the winner copy to itself.

4. A method for discovering and resolving conflicts as recited in claim 1 wherein said change history comprises a list of globally unique IDs which identify the latest change made by nodes in the network which have changed the local copy of the replica object.

5. A method for discovering and resolving conflicts as recited in claim 1 further comprising the step of notifying one or more users of the conflict.

6. A method for discovering and resolving conflicts as recited in claim 1 wherein the replica object comprises a plurality of data set properties having at least one time stamp indicating the time that said plurality of data set properties were last modified.

7. A method for discovering and resolving conflicts as recited in claim 6 further comprising the step of selecting as the winner copy the copy of the replica object with the later time stamp so that the winner copy of the replica object has at least some of the data set properties of the replica object selected as the winner copy.

8. A method for discovering and resolving conflicts as recited in claim 7 further comprising the step of replacing data set properties of the winner copy having individual time stamps with data set properties of the copy not selected as the winner copy having individual time stamps which are later in time than the individual time stamps of the winner copy.

9. In a network comprising a plurality of nodes each of which can make changes to local copies of a replica object and each of which transmit any changes made to other nodes in the network, a method for each node (1) to independently detect conflicts that arise when two or more copies of the replica object are changed to introduce conflicts and (2) to take steps to resolve the conflicts without interrupting normal operation of the network the method comprising the steps of:

keeping at a local node a local copy of the replica object and a local change history comprising globally unique change numbers that together identify all changes that have been made to said local copy, whether at said local node or at other nodes in the network;

receiving, from another node in the network at least one message comprising a received copy of the replica object and a received change history;

comparing said received change history with said local change history and declaring a conflict if one of either said received change history or said local change history does not contain all the changes of the other;

performing a predetermined sequence of steps to select a winner copy of the replica object from among the received copy of the replica object and the local copy of the replica object and creating a conflict object by attaching to said winner copy at least the copy of the replica object not selected as the winner copy;

making a change to said conflict object; and replicating said change to said conflict object to other nodes in the network.

10. A method for discovering and resolving conflicts as recited in claim 9 further comprising the step of replacing the local copy of the replica object with the received copy of the replica object if no conflict exists and if the received replica object contains changes not found in the local replica object.

11. A method for discovering and resolving conflicts as recited in claim 10 wherein the local change history comprises the latest change made by nodes in the network which have changed the replica object.

12. A method for discovering and resolving conflicts as recited in claim 11 wherein each copy of the replica object has a time stamp and wherein each node in the network has a unique ID and wherein the sequence of steps used to select the winner copy comprises:

selecting, as the winner copy, the copy of the object with the later time stamp; and selecting, as the winner copy, the copy of the object which was changed by the node with the largest unique ID, if the time stamps of the received copy of the replica object and the local copy of the replica object are the same.

13. A method for discovering and resolving conflicts as recited in claim 12 further comprising the step of attaching the winner copy to itself.

14. A method for discovering and resolving conflicts as recited in claim 13 further comprising the step of initiating final resolution of the conflict.

15. In a network comprising a plurality of computer systems interconnected by networking means, each of said computer systems adapted to make changes to local copies of a replica object and transmit any changes made to other computer systems, an article of manufacture for use in a one of the computer systems comprising:

program storage means, accessible by a CPU of a local computer system, for storing and providing, to the CPU, program code means, said program code means comprising:

means for receiving from other computer systems, via the networking means, at least one message comprising a received copy of a replica object and a received change history identifying changes made to said replica object;

means for determining if a conflict exists between a local copy of the replica object and said received copy of the replica object;

means for selecting a winner copy of the replica object from among the local copy of the replica object and the received copy of the replica object; and means for attaching to said winner copy at least the copy of the object not selected as the winner copy in order to create a conflict object that can be transferred between the computer systems just like other replica objects.

16. An article of manufacture as recited in claim 15 wherein the means for determining if a conflict exists comprises means for comparing the local copy of the replica object to the received copy of the replica object.

17. An article of manufacture as recited in claim 16 wherein the means for comparing the local copy of the replica object to the received copy of the replica object compares a change history of the local copy of the replica object to a change history of the received copy of the replica object.

18. An article of manufacture as recited in claim 15 wherein the program code means further comprises means for final conflict resolution.

19. An article of manufacture as recited in claim 18 wherein the means for final conflict resolution comprises means for notifying one or more owners of the replica object that a conflict exists.

20. An article of manufacture as recited in claim 18 wherein the means for final conflict resolution further comprises means for presenting to an owner of the replica object the conflicts that exist.

21. An article of manufacture as recited in claim 15 wherein local copy of the replica object and the received copy of the replica object each have an associated time stamp and wherein the means for selecting a winner copy of the replica object selects the object with the latest time stamp.

22. An article of manufacture as recited in claim 21 wherein each computer system in the network has a unique ID and wherein the means for selecting a winner copy of the replica object selects the copy of the replica object changed by the system with the largest unique ID if the time stamps of each copy of the replica object is the same.

23. An article of manufacture as recited in claim 15 wherein the means for attaching to the winner copy at least the copy of the replica object not selected as the winner copy comprises means for attaching the winner copy to itself.

24. An article of manufacture for use in any one of a plurality of computer system, each of which can make changes to local copies of a replica object and each of which transmit any changes made to other computer systems through networking means, said article of manufacture comprising:

program storage means, accessible by CPU of a local computer system, for storing and providing, to the CPU, program code means, said program code means comprising;
  means for determining if a conflict exists between a local copy of a replica object and a received copy of a replica object, said local copy of the replica object and said received copy of the replica object comprising a plurality of data set properties and one or more time stamps associated with one or more data set properties;
  means for creating a new copy of the replica object that can be changed and transmitted to other replica nodes without interrupting normal operation of the network comprising:
   means for selecting a winner copy of the replica object from among the local copy of the replica object and the received copy of the replica object;
   means for attaching to the winner copy of the replica object, the copy of the replica object not selected as the winner copy; and
   means for placing in the winning copy of the replica object those properties from the local copy of the replica object and the received copy of the replica object having the latest associated time stamp.

25. An article of manufacture as recited in claim 24 wherein the program code means further comprises means for placing in the winning copy of the replica object those properties from the local copy of the replica object and the received copy of the replica objects which have no corresponding entry in either the local copy of the replica object or the received copy of the replica object.

26. An article of manufacture for use in any of a plurality of nodes each of which can make changes to local copies of a replica object and each of which transmit any changes made to other nodes in a manner so that each node is able (1) to independently detect conflicts that arise when two or more copies of the replica object are changed to introduce conflicts and (2) to take steps to resolve the conflicts without interrupting normal operation of the network, the article of manufacture comprising:

program storage means for storing and providing program code means, said program code means comprising:
  means for keeping at a local node a local copy of the replica object and a local change history comprising globally unique change numbers that together identify all changes that have been made to said local copy, whether at said local node or at other nodes in the network;
  means for receiving, from another node in the network, at least one message comprising a received copy of the replica object and a received change history;
  means for detecting if a conflict exists between said received copy and said local copy and taking steps to resolve any detected conflict without interrupting normal operation of the network, said means for detecting comprising:
   means for comparing said received change history with said local chance history;
   means for declaring a conflict only if one of either said received change history or said local change history does not contain all the changes of the other;
   means for resolving a declared conflict comprising (1) means for creating a new copy of the replica object that can be changed and transmitted to other replica nodes without interrupting normal operation of the network, said new copy comprising a winner copy the replica object and at least one attached copy of the replica object (2) means for executing a predetermined sequence of steps that deterministically select one of either said received copy or said local copy as said winner copy, and (3) means for attaching the copy not selected as the winner copy to the winner copy; and
  means for replacing said local copy with said received copy if said received copy contains all changes of said local copy, otherwise discarding said received copy and retaining said local copy.

\* \* \* \* \*

UNITED STATES PATENT AND TRADEMARK OFFICE
CERTIFICATE OF CORRECTION

PATENT NO. : 5,787,262
DATED : Jul. 28, 1998
INVENTOR(S) : Shakib et al.

It is certified that error appears in the above-identified patent and that said Letters Patent is hereby corrected as shown below:

Col. 1, line 26, before "and" delete "is"

Col. 1, line 27, before "resources" change "information" to --informational--

Col. 1, line 50, after "as" delete the comma

Col. 7, line 65, after "labeled" change "A-E" to -- A-F --

Col. 14, line 50, after "with the" change "earliest" to --latest--

Col. 21, second row down, first box, change "D6" to --A8--

Col. 21, third row down, first box, change "C4" to --D6--

Col. 27, line 16, after "F500" change "G01" to --G10--

Col. 30, line 6, after "time stamp" change "$T_2$" to --$T_1$--

Col. 30, line 47, after "time stamp" change "$T_2$" to --$T_2$"--

Col. 32, line 5, after "network" insert a comma

Col. 33, line 20, after "network" insert a comma

Col. 34, line 67, after "computer" change "system" to --systems--

UNITED STATES PATENT AND TRADEMARK OFFICE
CERTIFICATE OF CORRECTION

PATENT NO. : 5,787,262
DATED : July 28, 1998
INVENTOR(S) : Shakib, et. al.

It is certified that error appears in the above-indentified patent and that said Letters Patent is hereby corrected as shown below:

Col. 36, line 21, after "local" change "chance" to --change--

Signed and Sealed this

Sixteenth Day of November, 1999

Attest:

Attesting Officer

Q. TODD DICKINSON

Acting Commissioner of Patents and Trademarks